(12) United States Patent
Werth et al.

(10) Patent No.: US 9,077,736 B2
(45) Date of Patent: Jul. 7, 2015

(54) SYSTEMS AND METHODS FOR PROVIDING A CLIENT AGENT FOR DELIVERY OF REMOTE SERVICES

(75) Inventors: Theodore Werth, Billerica, MA (US); Joshua Goldlust, Billerica, MA (US)

(73) Assignee: PLUMCHOICE, INC., Billerica, MA (US)

( * ) Notice: Subject to any disclaimer, the term of this patent is extended or adjusted under 35 U.S.C. 154(b) by 89 days.

(21) Appl. No.: 12/842,691

(22) Filed: Jul. 23, 2010

(65) Prior Publication Data

US 2011/0022653 A1 Jan. 27, 2011

Related U.S. Application Data

(60) Provisional application No. 61/228,229, filed on Jul. 24, 2009.

(51) Int. Cl.
*G06F 15/16* (2006.01)
*H04L 29/08* (2006.01)

(52) U.S. Cl.
CPC ............... *H04L 67/125* (2013.01); *H04L 67/30* (2013.01); *H04L 67/34* (2013.01)

(58) Field of Classification Search
CPC ........ H04L 67/34; H04L 67/30; H04L 67/125
See application file for complete search history.

(56) References Cited

U.S. PATENT DOCUMENTS

| 7,269,569 | B2 | 9/2007 | Spira et al. |
| 7,464,046 | B2 * | 12/2008 | Wilson et al. ............. 455/456.1 |
| 7,464,163 | B1 | 12/2008 | Bantz et al. |
| 7,774,223 | B2 | 8/2010 | Karabetsos |
| 7,881,945 | B2 | 2/2011 | Schmitt et al. |
| 7,930,346 | B2 * | 4/2011 | Jhaveri et al. ................. 709/201 |
| 8,060,377 | B2 | 11/2011 | Dunham et al. |
| 8,141,164 | B2 | 3/2012 | Kamath et al. |

(Continued)

OTHER PUBLICATIONS

Office Action on U.S. Appl. No. 12/842,683 dated Apr. 24, 2012.

(Continued)

*Primary Examiner* — Patrice Winder
*Assistant Examiner* — Nam Tran
(74) *Attorney, Agent, or Firm* — Christopher J. McKenna; Foley & Lardner LLP

(57) ABSTRACT

The solution of the present application provides many types and forms of resources, such as products or services, to an environment of heterogeneous devices. An agent and centralized service may communicate to deliver an optimum package of resources to a device. Each device may include an agent that collects information important to determining the appropriate resources for the device and understanding the environment the devices are contributing to. The information may be stored and analyzed in a cross device knowledge base, and the knowledge base may be consulted to determine resources appropriate for devices. The agent and centralized service may engage in pro-active alerting and provisioning of services, based on any collected information, to minimize the burden of resource procurement on the customer. After delivery of resources, the agent and centralized service may also perform updating, repairing, and healing functions for the resources. Resources may be aggregated into a cohesive platform to be combined and delivered in an optimum manner, and resources may also be maintained and monitored to ensure their quality via escalation or remedial action. Devices may be connected to the resources through intelligent routing.

23 Claims, 13 Drawing Sheets

(56) References Cited

U.S. PATENT DOCUMENTS

| | | |
|---|---|---|
| 2002/0111826 A1 | 8/2002 | Potter et al. |
| 2003/0005107 A1 | 1/2003 | Dulberg et al. |
| 2005/0015501 A1 | 1/2005 | Kaplan et al. |
| 2005/0149368 A1* | 7/2005 | Brunet et al. ............... 455/423 |
| 2005/0182660 A1 | 8/2005 | Henley |
| 2006/0149611 A1 | 7/2006 | Diep et al. |
| 2006/0195581 A1 | 8/2006 | Vaman et al. |
| 2006/0247959 A1 | 11/2006 | Oden |
| 2006/0277096 A1 | 12/2006 | Levitus |
| 2007/0005414 A1 | 1/2007 | Connors et al. |
| 2007/0014314 A1* | 1/2007 | O'Neil ......................... 370/401 |
| 2007/0038476 A1 | 2/2007 | Sternlicht |
| 2007/0100585 A1 | 5/2007 | Dulberg et al. |
| 2007/0101178 A1 | 5/2007 | Jammu et al. |
| 2007/0283016 A1 | 12/2007 | Pendarakis et al. |
| 2008/0071922 A1 | 3/2008 | Chetuparambil et al. |
| 2008/0091454 A1 | 4/2008 | Fisher |
| 2008/0172574 A1 | 7/2008 | Fisher |
| 2008/0183542 A1 | 7/2008 | Connors et al. |
| 2008/0201196 A1 | 8/2008 | Rowland |
| 2008/0294776 A1 | 11/2008 | Ding |
| 2009/0018890 A1 | 1/2009 | Werth et al. |
| 2009/0125608 A1 | 5/2009 | Werth et al. |
| 2009/0158189 A1 | 6/2009 | Itani |
| 2009/0240551 A1 | 9/2009 | Writz et al. |
| 2010/0235142 A1 | 9/2010 | Jammu et al. |
| 2010/0325277 A1 | 12/2010 | Muthiah et al. |
| 2011/0087511 A1 | 4/2011 | Werth et al. |

OTHER PUBLICATIONS

Office Action on U.S. Appl. No. 12/842,702 dated Jul. 30, 2012.
International Preliminary Report on Patentability issued Feb. 2, 2012 in PCT Application No. PCT/US2010/043090.
International Search Report issued Apr. 5, 2011 in PCT Application No. PCT/US2010/043090.
US Office Action DTD Jan. 22, 2013.
US Office Action DTD Oct. 9, 2012.
US Office Action DTD Apr. 16, 2013.
US Office Action in U.S. Appl. No. 12/842,702 DTD Dec. 27, 2013.
US Office Action in U.S. Appl. No. 12/842,702 DTD Jun. 18, 2013.
Wikipedia, Windows Error Reporting, Nov. 22, 2008, pp. 1-3.
Wikipedia, Windows Update, Jan. 7, 2009, pp. 1-5.
US Office Action for U.S. Appl. No. 12/842,702 dated Aug. 12, 2014.
US Office Action for U.S. Appl. No. 12/842,683 dated May 21, 2014.
US Notice of Allowance for U.S. Appl. No. 12/842,702 dated Nov. 26, 2014.
US Office Action for U.S. Appl. No. 12/842,683 dated Oct. 29, 2014.

* cited by examiner

SYSTEMS AND METHODS FOR PROVIDING A CLIENT AGENT FOR DELIVERY OF REMOTE SERVICES

RELATED APPLICATION

This applications claims priority to and the benefit of U.S. Provisional Application No. 61/228,229, filed on Jul. 24, 2009 and entitled "Systems and Methods For Providing a Multi-Device, Multi-Service Platform Via A Client Agent", which is incorporated herein by reference in its entirety.

BACKGROUND

Modern day consumers often own multiple electronic devices, such as desktops, laptops, smartphones, personal digital assistants, cable set-top boxes, speakers, televisions, or GPS systems. Given the complex and disparate nature of these devices, obtaining full technical support across devices may be cumbersome. Support services are typically dispersed among different providers. Consumers may need to establish separate accounts with various providers or travel to different locations to obtain services for their devices.

Because the service providers reach the consumers through individual avenues and do not communicate with one another, they collectively provide fragmented and inefficient services. Each service provider performs its own examination upon devices, potentially resulting in repetitive discovery and diagnoses across providers. Further, solutions that each service provider learns in the course of their support remain with the individual providers, thereby limiting the providers' amount of knowledge and rate of learning.

Additionally, customers often have limited understanding of services for their devices. Customers typically seek services when a device malfunctions, they become dissatisfied with the device's level of performance, or they become aware of services through third-party avenues (e.g., advertisements, word of mouth). As continued support for devices is largely customer-driven, devices may not be optimally maintained.

SUMMARY OF THE INVENTION

The solution of the present application provides many types and forms of resources, such as products or services, to an environment of heterogeneous devices. An agent and centralized service may communicate to deliver an optimum package of resources to a device. Each device may include an agent that collects information important to determining the appropriate resources for the device and understanding the environment the devices are contributing to. The information may be stored and analyzed in a cross device knowledge base, and the knowledge base may be consulted to determine resources appropriate for devices. The agent and centralized service may engage in pro-active alerting and provisioning of services, based on any collected information, to minimize the burden of resource procurement on the customer. After delivery of resources, the agent and centralized service may also perform updating, repairing, and healing functions for the resources. Resources may be aggregated into a cohesive platform to be combined and delivered in an optimum manner, and resources may also be maintained and monitored to ensure their quality via escalation or remedial action. Devices may be connected to the resources through intelligent routing.

In one aspect, the present invention relates to a method for providing a compilation of services via pools of service providers managed by a centralized service. The method comprises receiving, by a centralized service, a request to perform a compilation of services of a plurality of services provided via a plurality of pools of service providers of the centralized service. The compilation of services may identify a first type of service and a second type of service. The method further includes assigning, by the centralized service, a first service of the first type, to a first service provider selected from a first pool of service providers of the plurality of pools of service providers. The first pool of service providers may provide the first type of service. The method also entails assigning, by the centralized service, a second service of the second type, to a second service provider selected from a second pool of service providers of the plurality of pools of service providers. The second pool of service providers may provide the second type of service.

In some embodiments, the centralized service may receive the request from an agent of a device. The centralized service may receive the request to perform the compilation of services. The compilation of services may be compiled and recommended by the centralized service.

In one embodiment, each pool of service providers of the plurality of pools of services providers may provide a different type of service from other pools of service providers. A pool of service providers may comprise one or more automated systems to automatically provide a type of service. In some embodiments, a pool of service providers may comprise one or more remote service personnel to provide a type of service remotely. In other embodiments, a pool of service providers may comprise one or more onsite service personnel to provide a type of service onsite of requestor.

In some embodiments, the centralized service may select the first service provider from the first pool of service providers based on a measure of quality of service. The centralized service may determine that the first service of the first service type can be performed by an automated system and select an automated system as the first service provider. The centralized service may select the second service provider from the second pool of service providers based on one or more capabilities. The centralized service may determine that the second service of the second type is to be performed by an onsite person and select an onsite service provider as the second service provider.

In other embodiments, the centralized service may monitor a status of the compilation of services via the status of performance of the first service and the second service. The centralized service may monitor a quality of service of the compilation of service via measuring the quality of service of the first service and the second service.

In another aspect, the present invention relates to a method for providing a compilation of services via a centralized service using an automated system as a service provider. The method comprises receiving, by a centralized service, a request to perform a compilation of services of a plurality of services provided via the centralized service. The compilation of services may identify a first service of a first type and a second service of a second type. The method further includes determining, by the centralized service, that a first service of the plurality of services can be performed by an automated system of one or more automated systems of the centralized service. The method also entails assigning, by the centralized service, the automated system to perform at least a portion of the first service.

In some embodiments, the centralized service may receive the request from an agent of a device. The centralized service may determine that the first type of service corresponds to an automated service and may select the automated system from a pool of service providers comprising one or more automated systems. In other embodiments, the centralized service may determine that a second service of the plurality of services is to be performed by a remote service personnel, and the centralized service may assign a first remote service personnel to perform at least a portion of the second service. The centralized service may also determine that a second service of the plurality of services is to be performed by an onsite service personnel, and the centralized service may assign a first onsite service personnel to perform at least a portion of the second service. In one embodiment, the centralized service may assign the first service to an automated system of a first pool of service providers that perform the first type of service, and the second service to a second service provider of a second pool of service providers that perform the second type of service.

In some aspects, the present invention relates to a method for selecting between service provider types to provide a service via a centralized service. The method comprises receiving, by a centralized service, a request to perform a service from a plurality of services provided via the centralized service. The request may identify a first service having a first type. The method includes determining, by the centralized service based on the first type, a type of service provider to perform the first service. The method also includes assigning, by the centralized service to perform at least a portion of the first service, a service provider corresponding to the type of service provider. In some embodiments, the type of service may comprise a remote service personnel, an onsite service personnel and an automated system.

In one aspect, the present invention relates to a method for providing recommendation of a provisioning action for a device. The method comprises the following: transmitting, by a first agent executing on a first device to a centralized service, data about an environment of the first device; transmitting, by a second agent executing on a second device to the centralized service, data about an environment of the second device. The method further comprises receiving, by the first agent, from the centralized service a recommendation of a provisioning action for the first device. The recommendation from the centralized service may be based on correlating data between at least the first device and the second device. The method also includes generating, by the first agent, an alert on the first device to request a user of the device to execute the provisioning action.

In some embodiments, the first agent may establish a communications interface between a user of the first device and the centralized service. One of the first agent or the second agent may receive data from a third agent to transmit to the centralized service. In one embodiment, the first agent may transmit data about one of operation or performance of a combination of software and hardware of the device to the centralized service. The second agent may transmit data about one of operation or performance of a combination of software and hardware of the second device to the centralized service.

In other embodiments, the first agent may receive the recommendation of the provisioning action comprising at least one of the following: installation of recommended software, installation of recommended hardware, configuration action on installed software, configuration action on installed hardware of the device, execution of an optimization tool, execution of software, purchase of one or more remote services of the centralized service, provisioning of one or more remote services of the centralized service, de-installation of software, de-installation of hardware, a change to configuration of operating system, and a change to state of the operating system. In some embodiments, the first agent may transmit to the centralized service a request from the user to perform the provisioning action. The first agent may also transmit one of a status or result of execution of the provisioning action.

In some aspects, the present invention relates to a method for provisioning by an agent a remote service from a centralized service. The method comprises transmitting, by an agent executing on a device to a centralized service, data about an environment of the device; and receiving, by the agent from the centralized service, a recommendation of a remote service to be delivered by the centralized service to the device. The recommendation from the centralized service may be based on correlating data from the device with data from other devices via a cross-device database. The method also includes provisioning, by the agent in response to the recommendation, delivery of the remote service by the centralized service to the device.

In some embodiments, the agent may transmit data about one of operation or performance of a combination of software and hardware of the device. In other embodiments, the agent may receive a compilation of services generated from a service compiler of the centralized service. The agent may receive a recommended subscription to one or more remote services provided by the centralized service. In other embodiments, the agent may automatically connect to the centralized service to provision the remote service. In some embodiments, the agent may provision the remote service responsive to a policy of the user.

In one aspect, the present invention relates to a method for providing remote support service to a wireless device by a centralized service. The method comprises transmitting, to a centralized service by a first agent executing on a first device of a plurality of devices of a user, data about an environment of the first device; and transmitting, to the centralized service by a second agent executing on a wireless device of a plurality of devices of the user, data about an environment of the wireless device. The centralized service may correlate data between at least the first device and the wireless device of the user. The method further includes transmitting, by the second agent, a request to the centralized service for support on the wireless device responsive to selection by the user of a single user interface element on the wireless device; and receiving, by the wireless device via the second agent, a connection from the centralized service to provide remote support to the wireless device. In some embodiments, the second device may be wireless.

In one embodiment, the first agent may transmit data about one of operation or performance of the first device to the centralized service. The second agent may transmit data about one of operation or performance of the wireless device to the centralized service. The second agent may detect the user's selection of the single user interface element to request support from the centralized service. The second agent may establish the connection with the centralized service. In some embodiments, the wireless device may receive, via the connection, support from a remote support personnel of a pool of remote support personnel provided by the centralized service.

In another aspect, the present invention relates to a system for receiving services from a centralized service. The system comprises an agent executing on a device and in communication via a network with a centralized service; a data collection component of the agent for collecting data about one of operation or performance of a combination of software and hardware installed on the device and communicating the collected data to the centralized service; a delivery component of the agent for remote delivery of a compilation of one or more services from the centralized service determined based on data collected from the data collection component; and a provisioning component of the agent for provisioning a resource on the device based on a recommendation from the centralized service.

In some embodiments, the agent may comprise one or more of the following components: a sales component of the agent for identifying to the user of the device one of a product or service for the device based on a recommendation from the centralized service, a discovery component of the agent for discovering configuration of software and hardware of the device, a diagnostics component of the agent for performing diagnostics on the combination of software and hardware of the device, a reporting component of the agent for reporting on one of the operation or performance of the device, and an alerting component of the agent for alerting the user about information from other components of the agent. In one aspect, the present invention relates to a method for collecting data from heterogeneous devices by a centralized service. The method comprises receiving, via a first network by a centralized service from each of a first plurality of agents resident on a first plurality of heterogeneous devices of a first user, first set of data about one of operation or performance of a first combination of software and hardware installed on the first plurality of heterogeneous devices; and receiving, via a second network by the centralized service from each of a second plurality of agents resident on a second plurality of heterogeneous devices of a second user, a second set of data about one of operation or performance of a second combination of software and hardware installed on the second plurality of heterogeneous devices. The method further includes correlating, by the centralized service, the first set of data of the first user to the second set of data of the second user; and storing, by the centralized service, the correlated data to one or more cross-device databases.

In one embodiment, the centralized service may receive from each of the first plurality of agents one or more events occurring on the first plurality of heterogeneous devices of the first user. In some embodiments, the centralized service may receive from each of the second plurality of agents one or more events occurring on the second plurality of heterogeneous devices of the second user. In other embodiments, the centralized service may identify a first sequence of events from the first set of data. The centralized service may identify a second sequence of events from the second set of data. In some embodiments, the centralized service may correlate a first event from the first set of data of the first device with a second event of the second set of data of the second device. In certain embodiments, the centralized service may determine an outcome from correlating the first set of data and the second set of data.

In another aspect, the present invention relates to a method for providing an alert by a centralized service to a device based on a cross-device knowledge base. The method comprises receiving, by a centralized service from an agent executing on a device, data identifying an event in an environment of the device; identifying, by the centralized service, a correlation between the event in the environment of the device with a cross-device database comprising events from operation of combinations of software and hardware of a plurality of heterogeneous devices and reported by each agent residing on the plurality of heterogeneous devices; and determining, by the centralized service, an outcome based on the correlation.

In one embodiment, the centralized service may receive data identifying a sequence of events in the environment of the device. In some embodiment, the centralized service may receive data identifying the event comprising an issue with one of operation or performance of the device. In other embodiments, the centralized service may identify a sequence of events from operation of a first combination of a first hardware and a first software on a plurality of heterogeneous devices. In some embodiments, the centralized service may identify the correlation between the event and a sequence of events stored in the cross-device database. In certain embodiments, the centralized service may determine the outcome as a second event to occur on the device. In some other embodiments, the centralized service may determine the outcome as a state of the device. In some embodiments, the centralized service may transmit information about the outcome to the agent. In other embodiments, the centralized service may transmit information about the outcome to one or more subscribers to the centralized service.

In another aspect, the present invention relates to a method for providing by a centralized service a compilation of services to a device based on a cross-device knowledge base. The method comprises receiving, by a centralized service from an agent executing on a device, data collected about an environment of the device, the data identifying a first plurality of events; identifying, by the centralized service, a correlation of the first plurality of event from the collected data with a second plurality of events in a cross-device database comprising events from operation of combinations of software and hardware of a plurality of heterogeneous devices and reported by each agent residing on the plurality of heterogeneous devices; and determining, by the centralized service to the agent, one or more services of the centralized service based on the correlation.

In one embodiment, the centralized service may receive from the agent collected data identifying the first plurality of events resulting from operation of the device. In some embodiments, the centralized service may identify the first sequence of events from operation of a first combination of a first hardware and a first software on the device correlates to the second sequence of events from operation of combinations of the first hardware and the first software on the plurality of heterogeneous devices. In other embodiments, the centralized service may determine one or more services to address an outcome from the correlation. In some other embodiments, the centralized service may identify for one or more services a remote service to be performed by a remote online technician. In some embodiments, the centralized service may identify for one or more services a service to be performed by the agent. In another embodiment, the centralized service may identify for one or more services a compilation of services.

BRIEF DESCRIPTION OF DRAWINGS

The foregoing and other objects, aspects, features, and advantages of the present invention will become more apparent and better understood by referring to the following description taken in conjunction with the accompanying drawings, in which.

DETAILED DESCRIPTION

Figure 1:
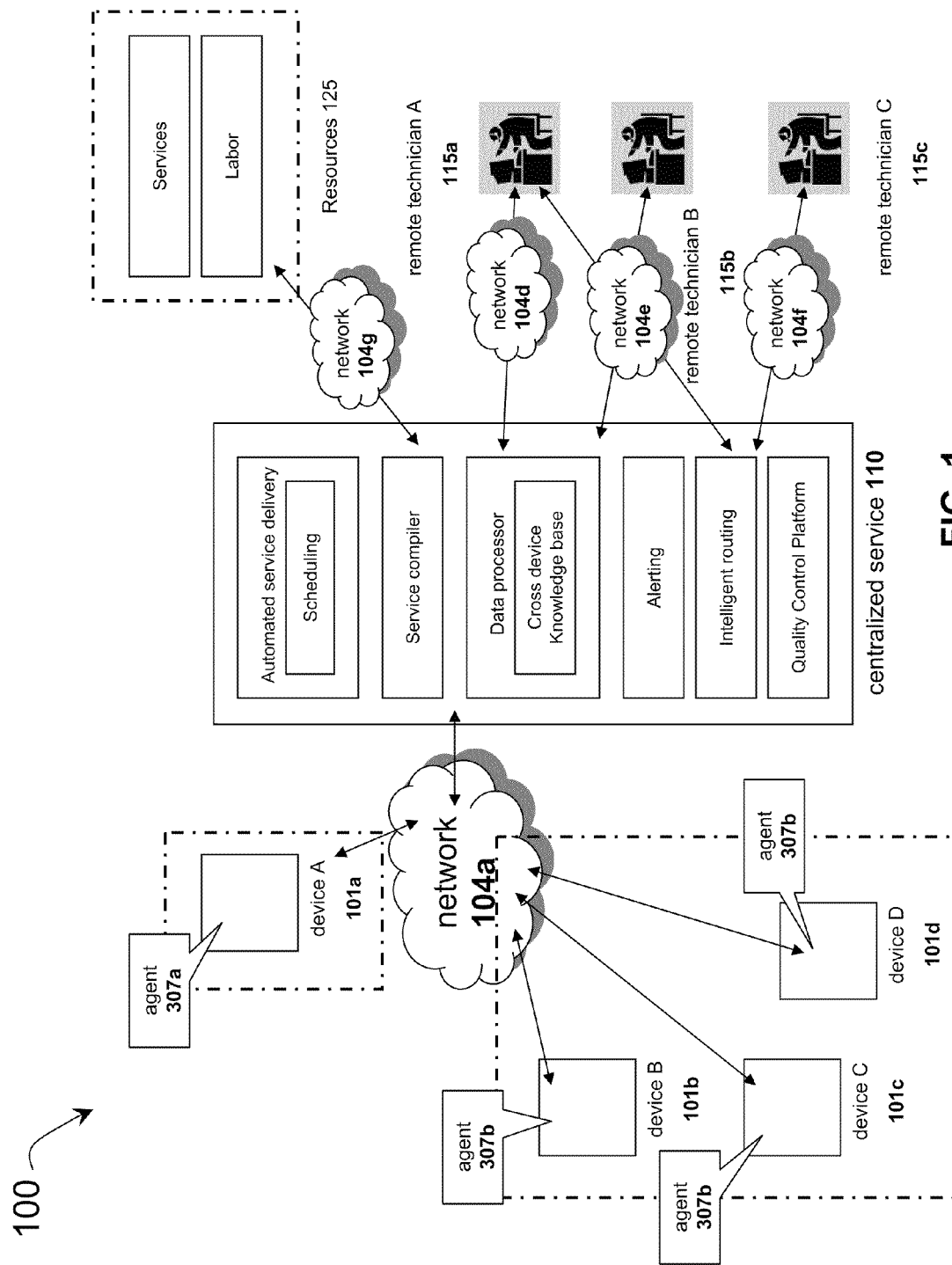
FIG. 1 is a block diagram that depicts an embodiment of an environment to provide resources to devices via a centralized service.

Referring to FIG. 1, a block diagram of an environment 100 to provide resources to one or more devices via a centralized service is shown and described. In brief overview, the system includes one or more devices 101a, 101b, 101c, 101d (101 in general) connected via one or more networks 104 to a centralized service 110. The centralized service 110 is connected via one or more networks 104 to resources 125. A customer or an agent 307 on a device 101 may request a resource for a device 101 from the centralized service 110, and in response, the centralized service 110 delivers the resource or arranges for access thereto. Resources may include software applications to install on the devices 101, software applications that render services for the devices 101, remote technicians 115a, 115b, 115c (115 in general) who connect remotely to provide support services, pools of labor who schedule on-site visits, or any other resource known to one of ordinary skill in the art.

The device 101 may comprise any type and form of electronic device. In one embodiment, a device 101 is any type of computing device such as a desktop computer or a laptop computer. In another embodiment, the device 101 is any electronic equipment capable of connecting to a network. In still another embodiment, the device 101 is any type and form of communications device. In yet another embodiment, the device 101 is a cellular phone. In one embodiment, the 101 is a BLACKBERRY device manufactured by Research in Motion (RIM) of Waterloo, Ontario, Canada. In another embodiment, the device 101 is a personal digital assistant (PDA) phone or smartphone such as one manufactured by Palm Inc. of Sunnyvale, Calif. In still another embodiment, the device 101 is an IPHONE manufactured by Apple Inc. of Cupertino, Calif.

In some embodiments, the device 101 is television, such as a High Definition Based television (HDTV), a Liquid Crystal Display (LCD) television, a Plasma based television, a Digital Light Processing (DLP) television, or a Cathode Ray Tube (CRT) based television. In some embodiments, the device 101 is a projector. In further embodiments, the device 101 can be a digital camera, a video cassette recorder (VCR), a digital video recorder (DVR) such as one manufactured by TiVo Inc. of Alviso, Calif., a printer, a telephone, a digital music player, a stereo, a printer, a scanner, a speaker, a cable box, a media server, or any other electronic gadget and equipment as apparent to one skilled in the art.

Furthermore, the device 101 may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may comprise a built-in network adapter, network interface card, PCMCIA network card, card bus network adapter, wireless network adapter, USB network adapter, modem or any other device suitable for interfacing the device 101 to any type of network capable of communication and performing the operations described herein.

The device 101 may include any type and form of operating system, which control scheduling of tasks and access to system resources. In some embodiments, the device 101 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP and WINDOWS VISTA, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

Each device 101 may be associated with a customer account on the centralized service 110. A customer account may include a single device 101 or multiple devices 101. Devices 101 receive resources delivered by the centralized service 110. In some embodiments, a customer uses a device 101 associated with the customer account to request the resource. For example, the customer may press a button on a personal digital assistant (PDA) or an icon on a smartphone to contact a customer service representative, and the representative may cause the centralized service 110 to deliver the resource to the device 101. In other embodiments, a customer uses a separate device to request the resource for the device 101. In some embodiments, a customer may dial a service number using a telephone to speak with a representative. In additional embodiments, a customer may access a web portal associated with the centralized service 110 using a computer and complete a work order form. The computer may submit the completed work order form to the centralized service 110 for processing and subsequent delivery of resources to the device 101 associated with the customer account. In other embodiments, an agent 307 on the device 101 requests the resource, as explained in further detail below.

The agent 307 may be, for example, implemented as a software program and/or as a hardware device, such as, for example, an ASIC or an FPGA. The agent 307 may comprise any program, application, process, task or set of executable instructions capable of connecting to and communicating with the device 101 or the centralized service 110. In some embodiments, the agent 307 may be a daemon process or network driver for listening, receiving and/or sending communications for an application, such as email, database or an enterprise application. In some embodiments, the agent 307 may communicate on a specific IP address, or IP address and port. In some embodiments, the agent 307 may comprise a collection of agents. In some embodiments, the agent 307 includes remote assist technology, such GoToAssist technology manufactured by Citrix Online, LLC of Santa Barbara, Calif., part of Citrix Systems, Inc. of Ft. Lauderdale, Fla. or Bamboo technology manufactured by Atlassian Pty Ltd. of Sydney, Australia. In various embodiments, the agent is configured to connect to the centralized service 110. The agents 307 on various devices may be integrated into a common application programming interface (API).

In some embodiments, service personnel may install a hardware agent 307 on a device 110 at a point of service. In other embodiments, a customer may cause a software agent 307 to be downloaded to a device. For example, a customer may create a customer account using the device 101 and download the agent 307 onto the device 101. In other examples, a customer may add a device 101 to a customer account, and the centralized service 110 may deliver an agent 307 to the device 101. The customer may request delivery of a resource to the device 101, and the centralized service 110 may automatically add the device 101 to the customer account and deliver an agent 307 in conjunction with the requested resource. In some embodiments, the customer requests access to a remote technician 115, and the remote technician 115 downloads an agent 307 onto the device 101. In various embodiments, an agent 307 on one device 101 initiates the delivery of an agent to another device 101. An agent 307 on one device may detect the presence of a device 101 newly added to an environment. The agent 307 may communicate with the centralized service 110 to deliver an agent 307 to the newly connected device, or the agent 307 may replicate itself to deliver an agent 307 directly to the device. In these embodiments, the agent 307 communicates with the centralized service 110 to add the new device 101 to the customer account.

The agent 307 communicates with the centralized service 110 to deliver resources to the device 101. The agent 307 and service 110 cooperate to improve or optimize the overall quality of resources the device 101 receives. The agent 307 may discover information regarding the device 101. The agent 307 may collect information regarding an individual device 101 or multiple devices 101 in an environment. The agent 307 may communicate the information to the centralized service 110 for storage and analysis. The agent 307 may coordinate with the centralized service 110 to deliver resources to the device 101, and in some embodiments, the agent 307 may first provision the device 101 to accommodate the resources. The agent 307 may perform diagnostics upon the device 101. The agent 307 may generate reports regarding the history and performance of the device 101. The agent 307 may communicate with the centralized service 110 to generate alerts for recommended service actions or identify potential problems. The agent 307 may provide targeted advertising, and subsequently work order forms, for products and services. The agent 307 may generate alerts or targeted advertising according to the results of discovery, data collection, diagnostics, or any other event known to persons of ordinary skill in the art.

In one embodiment, the centralized service 110 is executed on one or more servers. The server may be referred to as a file server, application server, web server, proxy server, or gateway server. In some embodiments, the server may have the capacity to function as either an application server or as a master application server. In one embodiment, the system 100 may include multiple, logically-grouped servers. In these embodiments, the logical group of servers may be referred to as a server farm. In some of these embodiments, the servers of the farm may be geographically dispersed. In some cases, a farm may be administered as a single entity. In other embodiments, the server farm comprises a plurality of server farms. In one embodiment, the server and/or server farm executes one or more applications on behalf of the centralized service 110. The servers within each farm can be heterogeneous. One or more of the servers can operate according to one type of operating system platform (e.g., WINDOWS NT, manufactured by Microsoft Corp. of Redmond, Wash.), while one or more of the other servers can operate on according to another type of operating system platform (e.g., UNIX or Linux). The group of servers logically grouped as a farm may be interconnected using a wide-area network (WAN) connection or metropolitan area network (MAN) connection. Data transmission speeds between servers in the farm 38 can be increased if the servers are connected using a local-area network (LAN) connection or some form of direct connection.

The centralized service 110 organizes, coordinates, and optimizes the delivery of resources to the devices 101. The centralized service 110 may include a service compiler that aggregates information about the resources and acts as a subscription or point product offering of various resources for sale to the devices 101. In some embodiments, the centralized service 110 aggregates the resources by offering itself as a platform as a service (PaaS). The centralized service 110 may include an automated service delivery unit that communicates with the service compiler, the agents 307, a data processor, an alert generator, or any combination thereof to deliver automatically a resource to a device 101. A scheduling unit of the automated service delivery unit may store and process action items for delivering various types of resources to devices 101 according to various rules.

The data processor may store information about customer accounts and individual devices. The data process may also store in a cross device knowledge base information received from customers, OEMs, agents, and remote technicians about compatibility or conflicts associated with various combinations of devices and resources. Additionally, the data processor may include an engine that analyzes information about devices and combinations thereof and store the results in the knowledge base. The alert generator may generate and send alerts to agents regarding recommended services or potential problems, and the generator may communicate with the cross device knowledge base, the automated service delivery unit, any other unit, or any combination thereof to decide when and how to generate an alert.

The centralized service 110 may include an intelligent routing unit. The intelligent routing unit may communicate with other units on the centralized service 110 or agents 307 to determine which resource shall be delivered to a device 101. The centralized service 110 may include a quality control platform to monitor and assess the quality of the services being delivered to the devices.

Although FIG. 1 shows a plurality of networks including network 104a between the devices 101 and the centralized service 110 and networks 104d-104g between the centralized service 110 and the resources, any or all of the devices 101, the centralized service 110, and the resources may be on the same network 104. In one embodiment, any of the networks 104 may be the same type of network or different types of networks. The network 104 can be a local-area network (LAN), such as a company Intranet, a metropolitan area network (MAN), or a wide area network (WAN), such as the Internet or the World Wide Web. The network(s) 104 may be a private or public network. In one embodiment, the network of the devices 101 may be a private network and network of the centralized services or resources may be a public network, or vice versa. In another embodiment, the network of the centralized services and the network of the devices may be private networks. In still another embodiment any network 104 may include one or more networks of different kinds as apparent to one of ordinary skill in the art.

In one embodiment, the network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may comprise a wireless link, such as an infrared channel or satellite band. In another embodiment, the topology of the network may be a bus, star, or ring network topology. In other embodiments, the network and network topology may be of any such network or network topology as known to those ordinarily skilled in the art capable of supporting the operations described herein.

In some embodiments, the centralized service 110 may connect to the devices 101 using any type and form of protocol, such as any internet protocols for communications. Examples of such protocols include but are not limited to application layer protocols such as HyperText Transfer Protocol (HTTP) and Dynamic Host Configuration Protocol (DHCP), transport layer protocols such as Transmission Control Protocol (TCP) and User Datagram Protocol (UDP), network layer protocols such as Internet Protocol (IP), datalink layer protocols such as IEEE 802.11, Token Ring and Ethernet and physical layer protocols such as RS-232 and Synchronous Optical Networking (SONET). In some embodiments, secure communications between a resource and the centralized service 110 are established via encryption, for example via a secure socket layer (SSL) or a virtual private network (VPN). In other embodiments, secure communications between the resources and the device 101 are established via encryption, for example via a secure socket layer (SSL) or a virtual private network (VPN). In yet another embodiment, end to end security is established between the resource and the device 101. With secured communications, the privacy of the data on a device 101 may be protected and/or maintained. Because of the ubiquity of networks, network connectivity and the internet the systems and methods of the system described herein is available in just about any possible customer scenario as apparent to one ordinarily skilled in the art.

Various types and forms of resources may be connected to the centralized service 110 for delivery to or access for the devices 101. In some embodiments, the resources may be proprietary or licensed by the centralized service provider. In additional embodiments, the resources may be third-party resources. In some embodiments, the resources may be software applications. For example, the software applications may be programs available for purchase, download, and/or installation from the centralized service 110. In another example, the software applications may be programs delivered to and executed on devices 101 to provide services. In other embodiments, the resources may be remote technicians. The remote technicians may connect to the devices 101 via the network 104 and perform any type and form of support, service, and repair on the devices 101. In additional embodiments, the resources may be pools of labor. Labor may arrive at any site and performance any type and form of physical activity for a devices, such as installation, network set-up and configuration, or physical moves.

Figure 2:
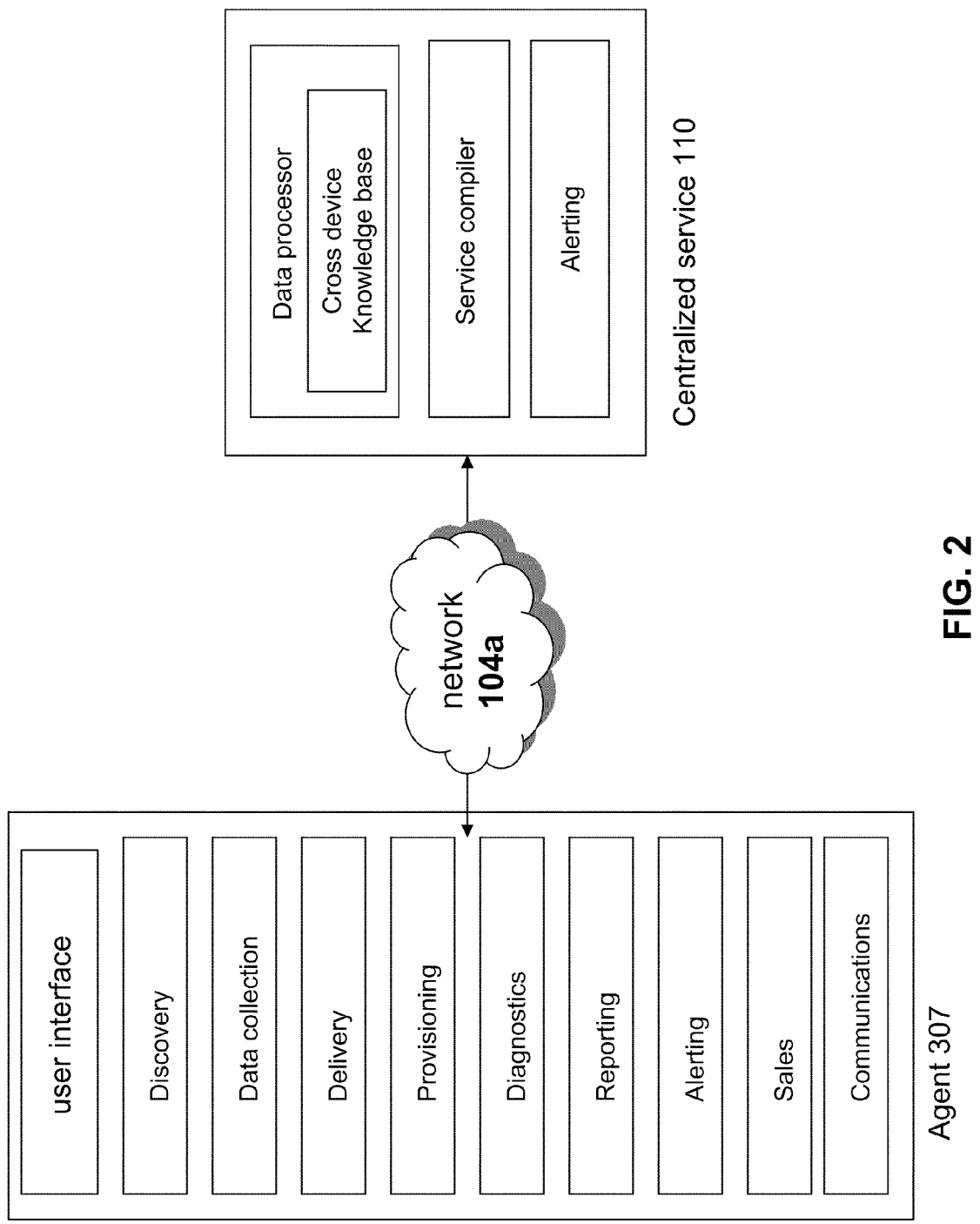
FIG. 2 is a block diagram that depicts an embodiment of an environment including an agent on a device in communication with a centralized service to provide resources to the device.

Referring now to FIG. 2, a block diagram of an example of an agent 307 is shown and described. The agent 307 may exist on a single device 101 or multiple devices associated with a customer account. In the latter case, the agent 307 may be integrated to a common application programming interface (API). The agent 307 may execute functions such as discovery, data collection, delivery, provisioning, diagnostics, reporting, alerting, and sales. For some of these functions, the agent 307 may communicate with the centralized service 110 over a network 104 to perform the execution.

In various embodiments, the agent 307 may discover any information regarding the device 101, such as any operational and/or performance related characteristics of the device or any hardware and/or software of the device. For example, the agent 307 may discover the manufacturer, the product line, the model, or any combination thereof for the device 101. The agent 307 may discover any information of any component or software on the device 101. For example, the agent 307 may discover the manufacturer, model, or speed of a processor. The agent 307 may discover the size of the hard drive and amount of available memory. The agent 307 may discover the type and version of the operating system running on the device 101. The agent 307 may discover the type and version of the office suite, media player, anti-virus protection, malware protection, operating system, or any other type of software installed on the device 101. The agent 307 may discover any information stored in a registry on the device 101. The agent 307 may discover information regarding the configuration of hardware, the operating system, any other software installed on the device 101. The agent 307 may discover information regarding the configuration of settings for services from the centralized service 110. The agent 307 may discover the resolution and size of a display of the device 101. The agent 307 may discover the communication capabilities of the device 101. For example, the agent 307 may discover that a smartphone operates on the T-Mobile network or a computer has a Bluetooth interface. The agent 307 may discover the number and type of input/output interfaces on the device 101, as well as information regarding the peripherals or other devices connected to the device 101. The agent 307 may discover the audio capabilities of the device 101.

The agent 307 may store the discovered information about a device 101 to storage or memory. The storage or memory may be located on the device 101 or the centralized service 110. In some embodiments, the agent 307 may store the information in a designated directory on the device 101. In other embodiments, the agent 307 may communicate with the centralized service 110 to store the information on the service. The information may be associated with a customer account. The information about the device 101 may be stored alone or in conjunction with information about other devices associated with the customer account. The agent 307 or the centralized service 110 may access the information at any time, whether the information is stored on the device 101 or the centralized service 110.

Discovery of information about a device 101 may occur at any time. In some embodiments, the user schedules the discovery of information. In many embodiments, the centralized service 110 schedules the discovery of information and instructs the agent 307 regarding the scheduling. In additional embodiments, the discovery of information occurs on an ad hoc basis. In some embodiments, the agent 307 discovers information about a device 101 when the agent 307 is installed upon the device. In other embodiments, the agent 307 discovers information at predetermined, periodic intervals and stores the updated information on the device 101 or the centralized service 110. In other embodiments, the agent 307 discovers information when the device 101 detects that a new device, such as a peripheral, has been connected or disconnected. In additional embodiments, the agent 307 discovers information when the device 101 detects that new components or software have been installed or removed.

In various embodiments, the agent 307 may collect data about a device 101 or multiple devices. In some embodiments, the agent 307 may collect data when the agent 307 discovers information about a device 101. The data may relate to the compatibility or conflicts regarding hardware and/or software on the device 101 or across devices. In some examples, the agent 307 may collect data on whether a software application can be successfully installed on a device 101 running a known operating system and set of other applications. In another example, a customer may wish to install a graphics-intense video game on a home entertainment system including a PC desktop running Windows VISTA, an Apple laptop running Mac OS in conjunction with VMware Fusion, a plasma television, and a Sony PSP. The agent 307 on the PC desktop and the agent 307 on the Apple laptop may collect data on whether the game can be installed to their respective devices. The agents may also collect data on whether their respective devices can communicate with one another and/or the Sony PSP to provide a networked gaming environment.

In another example, a customer may wish to install open source media development software on a home office system. The home office may include a PC laptop running Linux, an iPhone, an electronic photo album, and a speaker system. The agent 307 on the laptop may collect data on whether the software may be installed and whether the software can receive media files from the iPhone or electronic photo album for incorporation into projects in progress via the software. The agent 307 on the laptop may collect data on whether the software can communicate with the speaker system. The agent 307 on the iPhone may collect data on whether the iPhone can communicate with the laptop to accept and play media files developed by the software.

In many embodiments, the agent 307 may collect data when new hardware or software is installed upon the device 101. In some embodiments, the agent 307 may collect data whenever a customer initiates an action requiring communicate between devices using new or recently installed hardware or software. In many embodiments, the agent 307 may transmit the collected data to the centralized service 110 for storage and analysis. The centralized service 110 may store and analyze the data in the data processor and/or cross device knowledge base, as will be described in more detail below.

In various embodiments, the agent 307 performs diagnostics. The agent 307 may perform diagnostics on any hardware or software of the device. The agent 307 may perform diagnostics to identify configuration issues, sources of unsatisfactory performance, sources of instability, security vulnerabilities, privacy vulnerabilities, or any combination thereof. In many embodiments, the agent 307 may perform diagnostics in response to device events, at predetermined intervals, in response to customer initiatives, or any combination thereof. For example, the agent 307 may monitor the device to detect when a component has failed, the display has frozen, or the system has crashed and requires rebooting, and the agent 307 then performs diagnostics to identify the source of the malfunction. In other examples, the agent 307 may periodically scan system files to detect activities that may be slowing processing speeds or review the operating systems for known vulnerabilities. In additional examples, a customer may submit a work order to the centralized service 110 explaining her dissatisfaction with the device's performance, and the agent 307 may communicate with the centralized service 110 to perform diagnostics appropriate for the customer's concerns.

In many embodiments, the agent 307 may execute any procedure or run any application to perform the diagnostics. In some embodiments, the agent 307 may check the device configuration for problematic settings. In other embodiments, the agent 307 may evaluate processes running on the device 101 to identify potential viruses that are consuming processing capacity. In additional embodiments, the agent 307 may run applications that perform diagnostics, such as anti-virus or malware software. In other embodiments, after exhausting diagnostic capabilities at its immediate disposal, the agent 307 may communicate with the centralized service 110 to deliver more diagnostic resources to the device 101. In some embodiments, the agent 307 may request connection between the device 101 and a remote technician 115 for additional diagnostic support. In any of these embodiments, the agent 307 may use the results of the diagnosis to deliver resources to remedy the source of failure or sub-optimal performance, as will be explained in more detail below.

In various embodiments, the agent 307 may provision the device 101 for new or updated resources. In many embodiments, the agent 307 may provision the device 101 automatically. The automatic provisioning may occur in response to an alert or prior to delivery of software or services. In various embodiments, the agent 307 may provision the device 101 according to a scheduled basis. The agent 307 may refer to the user account to determine the schedule. In some embodiments, the agent 307 may provision the device 101 on an ad hoc basis. In many embodiments, the agent 307 may provision the device 101 upon confirmation that a user has approved the provisioning. In some of these embodiments, the agent 307 may appropriate and configure components for the resource. In other embodiments, the agent 307 may organize and expand the device capabilities to accommodate the resource. In many embodiments, the agent 307 may coordinate with the service compiler on the centralized service 110 to deliver a resource to the device 101. In some of these embodiments, the agent 307 and centralized service 110 may coordinate to deliver resources automatically according to predetermined rules, as will be explained in more detail below. In some embodiments, provisioning may include installing software or hardware on the device 101. In various embodiments, provisioning may include configuring and testing installed software or hardware on the device 101.

In various embodiments, the agent 307 may generate alerts, either alone or in conjunction with the centralized service 110, to recommend any type and form of product, service, or action. Through these alerts, the centralized service provider may exert more control over the customers' awareness of offered products and services, instead of relying on third-party channels of information and communication. The agent 307 may couple each alert with a work order form to facilitate the customer's acceptance of a recommended product or service. In some embodiments, the alerts may generate recommendations to optimize the customer's current use of his devices. In other embodiments, the recommendations serve to expand the customer's knowledge of available resources. The alerts may leverage information gathered through discovery, diagnosis, the customer's historical behavior, or any other collected data.

In many embodiments, the agent 307 may generate alerts to recommend provisioning actions. In one example, the agent 307 may diagnose a moderate amount of fragmentation on the device's 101 hard drive. The agent 307 may analyze how frequently the customer installs new applications or creates new files and recognize that the hard drive will become inadequate to support the customer's needs in the short-term. As a result, the agent 307 may generate an alert to recommend defragmentation of the hard drive to optimize the device's capacities. In another example, the agent 307 may begin to deliver a resource in response to a customer's work order form and detect that the resource requires greater access than the device's 101 privacy settings allow. The agent 307 may generate an alert to inform the customer of the necessary change before fulfilling the order.

In numerous embodiments, the agent 307 may generate alerts to recommend products or services. In many embodiments, the agent 307 may generate alerts in real-time. In some embodiments, the agent 307 may generate alerts on a scheduled basis. In various embodiments, the user may configure his account to determine when the agent 307 may generate alerts. In many embodiments, the agent 307 may refer to the user account or the centralized service 110 to determine when to generate alerts. In some embodiments, the agent 307 may generate alerts according to the user's type of subscription to the centralized service 110. In other embodiments, the agent 307 may generate alerts according to the level of complexity associated with the user's account. In various embodiments, the agent 307 may allow users to purchase products or services through the alerts. In some embodiments, the agent 307 may allow users to change their subscriptions through the alerts. In many of these embodiments, the agent 307 identifies the change to the subscription and adds, removes, or modifies products or services in the user account.

In some embodiments, the agent 307 may generate alerts based on discovered information. For example, the agent 307 may discover that a smartphone newly added to the customer's account has anti-virus protection, but no malware protection. In response, the agent 307 may generate an alert regarding the lack of malware protection and provide a work order form for malware resources available through the centralized service 110 and compatible with the smartphone. In another example, the agent 307 may test a component and note significant performance degradation since the last testing. The agent 307 may generate an alert warning the customer of potential component failure and provide work order forms for recommended replacement components and installation services. In another example, the agent 307 may discover that the device 101 is running older versions of software applications. The agent 307 may generate an alert to inform the customer that newer versions are available and provide a work order form for upgrades. The agent 307 may also generate this alert upon communications from the service compiler on the centralized service 110 that new versions and upgrades for software are available.

In other embodiments, the agent 307 may generate alerts based on the customer's historical data stored on the centralized service 110. In one example, a customer may historically configure her devices to the same level of privacy control. When the customer adds a new device 101 to her account and downloads an agent 307, the agent 307 may compare the privacy settings on the device to the customer's preferences and generate an alert if the settings do not match. In another example, a customer may historically add the same set of applications to devices used for business purposes. When the customer adds a new device 101 to her account, the agent 307 may determine whether the device 101 may be used for business purposes and generate an alert to add the preferred set of applications. As such, the agent 307 would generate this alert for a personal digital assistant (PDA) or desktop, but not for a television, camera, or set of speakers. In another example, the centralized service 110 may know that a customer's laptop and smartphone include the same application that recommends restaurants based on geographic location. When the customer adds a GPS system to her account, the agent 307 installed on the GPS system may generate an alert to install the restaurant recommendation application appropriate for the GPS system.

In another example, a device 101 may demonstrate a history of vulnerability or instability. The agent 307 may generate an alert to recommend services to identify sources of the vulnerability or instability and the appropriate remedies. Thus, an agent 307 may note that a device 101 has sought performance-related support once a week over the past month, and each investigation has discovered and eliminated spyware processes slowing down the device 101. The agent 307 may generate an alert to recommend anti-spyware programs compatible with the device.

Although the agent 307 generates alerts based on discovered information about the devices 101 or customers' historical data in the embodiments described herein, the agent 307 may generate alerts based on any type or kind of information, or combination thereof, known to persons in the art.

In various embodiments, the agent 307 may generate alerts to display advertisements to the customer. The agent 307 may display general or targeted advertisements. The agent 307 may display advertisements for the centralized service's proprietary or licensed resources or those owned by third parties. The agent 307 may display advertisements according to customer preferences regarding form, type, and content. The agent 307 may communicate with the centralized service 110 to select advertisements for display. The advertisements may facilitate the sale of products or services by providing access to order forms, which the centralized service may process and/or fulfill.

The advertisements may use any information to select advertisements for display. In one embodiment, the agent 307 may use information from the service compiler to advertise promotions for products or services. In another embodiment, the agent 307 may use information from the cross device knowledge base to cross-sell popular products and services known to be compatible with the customer's devices. In some embodiments, the agent 307 may use any information associated with a customer. For example, the agent 307 may use information about the customer's devices or the customer's history of usage. The agent 307 may display advertisements for hardware components with greater speeds or capacities than components on the customer's devices. The agent 307 may display advertisements for new releases of media players after observing that the customer frequently orders services associated with entertainment.

In various embodiments, the agent 307 may generate reports about the device 101. The report may contain information stored on the device 101, the centralized service 110, or both. In some embodiments, the report may contain information associated with the device's 101 hardware or software. In many embodiments, the report may contain information associated with the device's 101 use of the centralized service. In some embodiments, the report may contain information associated with the device's 101 performance. In all these embodiments, the report may categorize the information. The information may be categorized according to customer-defined categories, the centralized service's 110 categories, or any other means of categorizing the activities. For example, the report may categorize customer use of services according to those rendered in response to customer requests and those rendered in response to alerts.

The agent may include any type and form of communications interface such as email, instant messenger, texting, VoIP, chatroom, etc. In some embodiments, the communications interface establishes a form of communication with the centralized service. In some embodiments, the communications interface establishes a form of communication with another agent. In some embodiments, the communications interface establishes a connection with the centralized service. In some embodiments, the communications interface automatically establishes a connection with the centralized service and establishes communications with a remote technician of the centralized service. In some embodiments, the communications interface establishes a form of communications between a user of the device of the agent and another user on another device. In some embodiments, the communications interface establishes a form of communications between a user of the device of the agent and wireless device, such as PDA, cellphone or smartphone. In some embodiments, the communications interface establishes a form of communications between a user of the device of the agent and a landline phone. In some embodiments, the communications interface establishes a remote online support session between the device of the agent and another device. In some embodiments, the communications interface establishes a remote online support session between the centralized service and the device of the agent. In some embodiments, the communications interface establishes a multi-party communications session.

The agent may be componentized in any manner to provide any combination of the functionality related to data collection, diagnostics, discovery, delivery, provisioning, reporting, alerting and sales. The agent may be configurable to add, install or otherwise incorporate or include any of these components. The agent may be configurable to add, install or otherwise incorporate or include any of these components dynamically. The agent may be configurable to add, install or otherwise incorporate or include any of these components in real-time. The agent may be configurable to add, install or otherwise incorporate or include any of these components on demand. The agent may be configurable to add, install or otherwise incorporate or include any of these components via request by the centralized service. In some embodiments, the centralize service may add, install or otherwise incorporate or include any of these components in an agent. In some embodiments, the agent may download, obtain any of these components and add, install or otherwise incorporate or include any of these components in the agent. Any of these components may be added, installed, included or incorporated seamless and without user interaction. Any of these components may be removed, uninstalled or changes seamlessly and without user interaction. In some embodiments, the centralized service and/or agent may configure or change the configuration of any these components.

The agent may comprise any type and form of user interface. The user interface may have any arrangement and combination of user interface elements. A user may configure, interact and/or control and manage the agent via the user interface. A user may configure, interact and/or control and manage any one or more components of the user interface. A user may configure and manage any one or more policies or rules corresponding to the functionality of the agent and/or centralized service.

The agent may provide any selectable user interface or user interface element to launch any component of the agent. The agent may provide any selectable user interface or user interface element to launch connectivity to the centralized service. The agent may provide any selectable user interface or user interface element to request support or service from the centralized service. This selectable user interface element may be in any form, such as an icon, a shortcut, image of an app on a deck of a mobile device, a hyperlink, a URL, a menu item, etc.

In some embodiments, the agent comprises one of a discovery component, a data collection component, a delivery component, a provisioning component, a diagnostics component, a reporting component, an alerting component, a sales component and a communications component.

In some embodiments, the agent comprises any one of a discovery component, a data collection component, a delivery component, a provisioning component, a diagnostics component, a reporting component, an alerting component, a sales component and a communications component.

In some embodiments, the agent comprises a combination of any one of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any two of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any three of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component.

In some embodiments, the agent comprises a combination of any four of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any five of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any six of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component. In some embodiments, the agent comprises a combination of any seven of: a discovery component, a data collection component, a delivery component, a provisioning component, a diagnostics component, a reporting component, an alerting component, and a sales component with any one of: a discovery component, a data collection component, a delivery component, a provisioning component, a diagnostics component, a reporting component, an alerting component, and a sales component.

Figure 5:
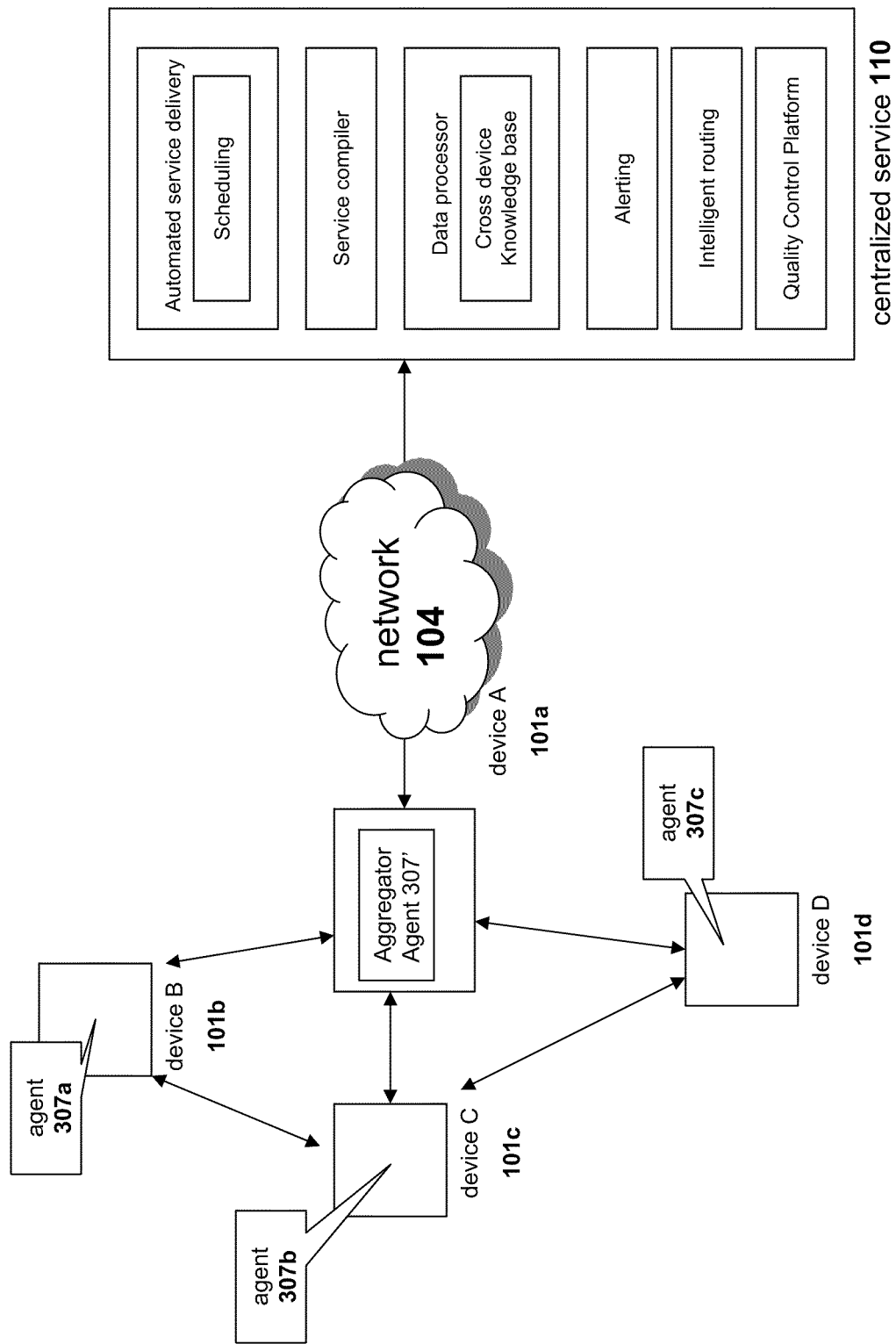
FIG. 5 is a block diagram that depicts an embodiment of an agent acting as an aggregator to the other agent.

Prior to going on to FIG. 3, other embodiments of the agent will be discussed in conjunction with FIG. 5. In brief overview, FIG. 5 illustrates an environment in which a plurality of agents may be in communication and communicate with each other. One of the agents, such as agent 307' may act as a central point and/or aggregator to one or more other agents, such as agents 307a-307c. The aggregator agent 307' may interface and/or communicate with the centralized service. The other agents 307A-307C may communicate with the aggregator agent 307'. The aggregator agent 307' may communicate with the centralized service on behalf of agents 307A-307C. The aggregator agent may act as a localized collection point of data and information collected from other agents. For example, an aggregator agent may be deployed at a site to collect data from all site agents and provide a collection of site data to the centralized service. In some embodiments, the aggregator agent installs, configures and manages the other agents on the network or site.

Each of the agents may be designed and constructed to communicate with another agent. The agents may communicate using any type and form of protocols. In some embodiments, any one agent may establish a transport layer connection, such as a TCP/IP connections with another agent. In some embodiments, an agent discovers via any discovery protocol, communications or processes that other agents on the network. In some embodiments, an agent may send out broadcast messages to find other agents on a network. In some embodiments, an agent may be configured with network identification information of one or more agents to use to establish communications. In some embodiments, an agent may query or request the centralized service to identify information about the other agents, such as network identifier information, (IP address/domain name and/or port) of device executing the agent.

An agent may share any collected data, discovered information, diagnostics information with another agent. In some embodiments, a plurality of agents communicate any collected data, discovered information or diagnostics information to the aggregator agent. The agent may provide this data to the centralized service as a package of individual device specific data. The agent may aggregate the data in a form to provide site data for all the devices on the site.

In some embodiments, different agents are provided on each device on the site or network configured or constructed to perform different functionality or have different components. For example, one device may have an agent that is configured to perform sales and provisioning. In another example, one device may have an agent perform alerts and reporting. In some embodiments, an agents performs one or more of the functionality of the agent components on behalf or for any other agent or device. For example, one agent may perform any function or component for all devices on network in communications with each other. In some embodiments, the aggregator agent performs a component or functionality for all of the other agents or one or more of these agents.

Figure 3:
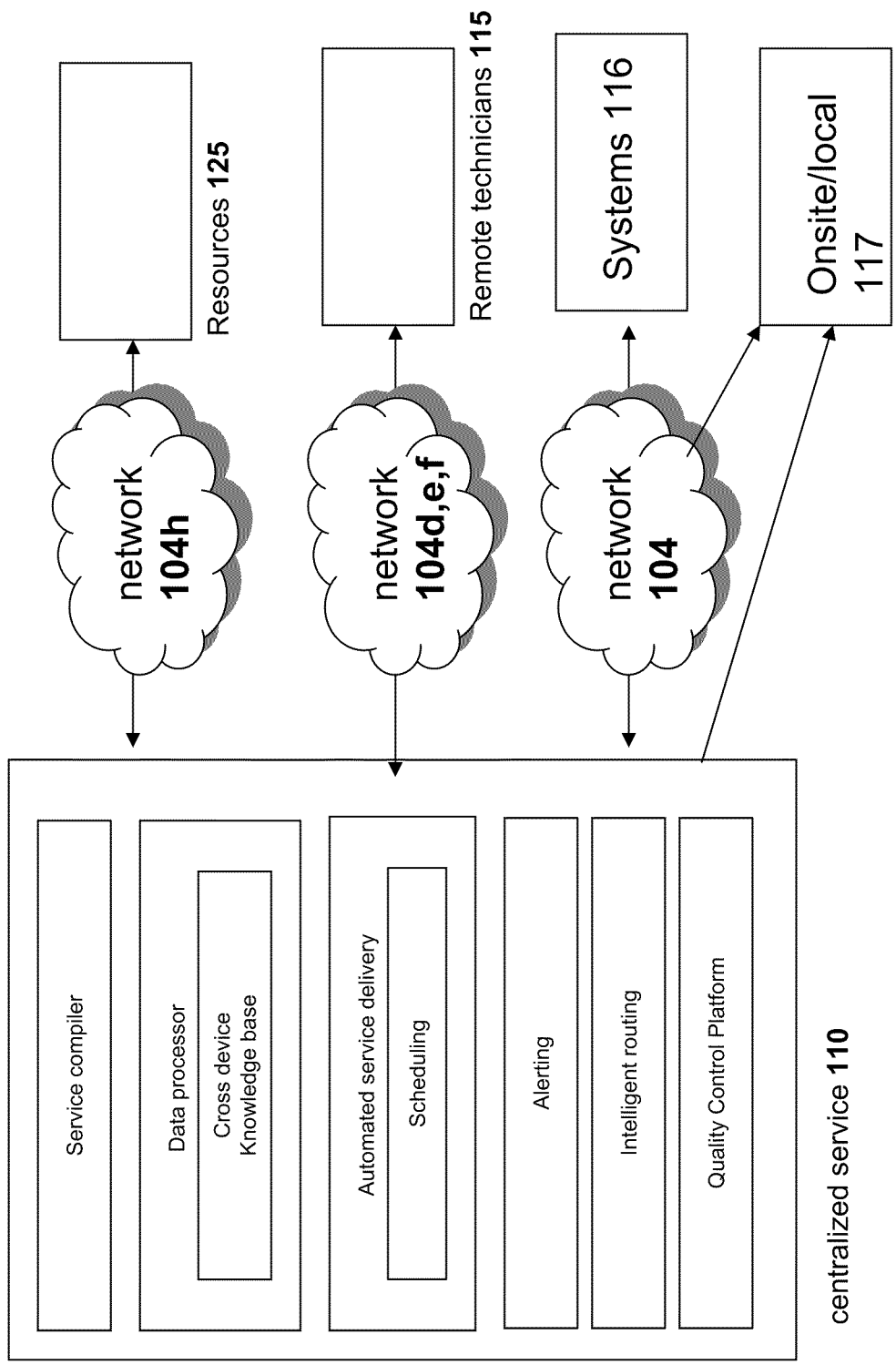
FIG. 3 is a block diagram that depicts an embodiment of a centralized service that provides access to resources for devices.

Referring now to FIG. 3, a block diagram of an example of a centralized service 110 is shown and described. The centralized service 110 aggregates access to resources, delivers resources to the devices 101, and collects and analyzes information to improve the quality of resource delivery. To these ends, the centralized service 110 may include a multi-service compiler, a data processor with a cross device knowledge base, an automated service delivery unit with a scheduling unit, an alerting unit, an intelligent routing unit, and a quality control platform.

The centralized service may identify and/or select any one or more of remote technicians, 115, systems 116 and/or onsite or local labor 117 to deliver a resource and/or perform a service, of any portions thereof. The centralized service may aggregate any combination of the systems, remote technicians and onsite labor to deliver or provide a service. For example, the centralized service may select and assign a remote technician to perform one task of a service, select and assign a system to perform another task of a service and select and identify onsite or local labor to perform yet another task of the service. Based on the request, customer or user of the request, and/or service requested, the centralized service may select from a remote technician, system or localized or onsite labor to perform a service based on any number of criteria, rules or policy.

The system 116 may comprise any type and form of applications, services, scripts programs, process, tasks or executable instructions to perform or provide a function, resource or service. In some embodiments, the systems may automatically perform or provide the function, resource or service. In some embodiments, the system may perform or provide the function, resource or service remotely via a network. In some embodiments, the system may perform or provide the function, resource or service on a device of the user. In some embodiments, the system may perform or provide the function, resource or service via combination of executing on the device of the user and remotely executing on a device of the system.

The system may automatically perform any of the functions, operations and/or services of the centralized service or any portions thereof. The system may perform any administrative functionality, such as account setup, user administration, subscription management, etc. The system may perform any billing management related functionality and operations. The system may perform any IT management related functionality and operations, such as system administration functions. The system may perform any device support and services, such as antivirus detection and resolution, device diagnostics, device performance or optimization tuning, software installation, system configuration, etc. The system may perform any type and form of entitlement services regarding the user's entitlement to software and software licenses for the device. The system may perform any type and form of license granting and management such any licenses for software and services. The system may perform any type and form of warranty service and management, including automating device or component repair, return and/or replacement services.

Resources may also include any type and form of human labor 117 that may be deployed locally or onsite for the requestor of the service. This type of labor may visit one or more locations associated with the requestor or as may be identified or requested by the requestor. The type of labor may perform services that cannot be automated and/or delivered remotely. This type of labor may perform services that are desirable or more efficient to handle in person or at a locale of the device or user. This labor 117 may deploy any resources, such as tools, vehicles, equipment, etc. to deliver or perform a service, or task thereof.

In various embodiments, the centralized service 110 includes a service compiler. The service compiler may identify and aggregate one or more services and/or products for delivery to the devices 101. In many embodiments, the service compiler may enumerate a list of resources based on an analysis of any data or information. In some embodiments, the service compiler may communicate with databases within the compiler, databases on the centralized service 110, third party databases, or any combination thereof to provide access to resources. The databases on the centralized service 110 may include proprietary or licensed resources. The service compiler may cache copies of the most frequently accessed resources. The centralized service 110 may be a platform as a service (PaaS) that allows resources on third party databases to be accessed by the devices 101.

In some embodiments, the service compiler may enumerate a list of products and/or services for subscription or sale. In additional embodiments, the service compiler may identify or present subscriptions to the centralized service 110 for packages of products, services, or both. In some embodiments, the subscriptions may vary by level of complexity. For example, the compiler may offer basic, advanced, and premium subscriptions that may differ according to the included type and number of products and level of support. The service compiler may offer subscriptions organized by type of resource, subscriptions that bundle different types of resources, or both. The service compiler may permit customers to customize their subscriptions. In some embodiments, a customer may create a subscription by adjusting a predefined subscription offered by the service compiler, and in other embodiments, a customer may create a subscription by selecting products and services made available through the service compiler.

In various embodiments, the centralized service 110 may include a data processor with a cross device knowledge base. The data processor communicates with agents 307 from devices 101 to collect data. The data may be associated with individual devices 101 or multiple devices 101 associated with a customer account. As previously discussed, the data processor may collect and store information about individual devices 101, such as the manufacturer, model, processor speed, display resolution, hard drive size, operating system, installed applications, attached peripherals, or any other information. The data processor may collect the same information about multiple devices 101 associated with a customer account.

In many embodiments, the data processor receives information associated with compatibility or conflict between devices and resources, and the processor may store the information in the cross device knowledge base. In some embodiments, the data processor receives the information from agents 307 when agents 307 detect events associated with compatibility or conflict. For example, after a customer attempts to install a software application on a device 101, the agent 307 may detect if the installation was successful. The agent 307 may transmit information to the data processor indicating whether a particular software application can be successfully installed on a device 101 of known model, memory size, operating system, and pre-existing set of applications. In other embodiments, the data processor receives the information from original equipment manufacturers (OEMs) regarding known compatibilities between their devices and resources. In further embodiments, the data processor receives the information from remote technicians. When the remote technicians access the devices 101 to deliver resources or troubleshoot issues, they may transmit their findings to the data processor.

In many embodiments, upon learning that a resource failed to install on a device 101, the data processor may search for a solution. The data processor may search the cross device knowledge base to determine if a known adjustment may enable the resource to install on the device 101. The data processor may search the cross device knowledge base for successful combinations of similar devices and resources, and suggest alternate resources of comparable utility to the customer. The data processor may store information regarding the unsuccessful attempted installation with a negative indicator. In some embodiments, the data processor may link entries with negative indicators (e.g., flags) to known, successful, alternate combinations of devices and resources to suggest to the customer. In some embodiments, the data processor may generate a notice regarding the unsuccessful attempted installation. The notice may be broadcast to any person or entity associated with the centralized service 110. The notice may invite the persons or entities to provide any knowledge regarding the unsuccessful installation to the data processor. As a result, the data processor may collect and store known solutions in the cross device knowledge base.

In many embodiments, the data processor may consult the cross device knowledge base when the service compiler receives a request to deliver a resource to a device 101. If the data processor determines that the resource will not install successfully, the data processor may cause the alerting unit to generate an alert informing the agent 307 of the problem. Additionally, the data processor may search the cross device knowledge base for known, successful, alternate combinations of devices and resources and include the possible alternatives in the alert. In some embodiments, the alerts may include work order forms for the possible alternatives that the customer may order.

In various embodiments, the centralized service 110 may include an automated service delivery unit. The automated service delivery unit may include rules associated with customer accounts. The rules may determine when services are delivered automatically to devices 101. In some embodiments, rules may be based on customer account settings. The customer may configure the settings when she first creates an account or reconfigure the settings at any time thereafter. The customer may require express consent to deliver any recommended services generated by alerts. The customer may permit delivery of any recommended services generated by alerts. The customer may require express consent to deliver certain types of recommended services, but permit automatic delivery of other types of services. In other embodiments, rules may be based on historical customer behavior. In additional embodiments, rules may be based on centralized service policies.

The automated service delivery unit may communicate with the service compiler to deliver resources to devices 101 according to the rules. The automated service delivery unit may include a scheduling unit, and the scheduling unit may store action items that trigger resource delivery at predetermined times according to the rules.

In some embodiments, the automated service delivery unit delivers resources at predetermined intervals according to settings in a customer account. In one example, the customer may schedule weekly removal of privacy-compromising files, monthly tune-ups, and quarterly virus scans and anti-virus definition reviews for a desktop computer. In another example, the customer may schedule weekly hard drive backups and biannual hard drive defragmentation. In a third example, the customer may schedule yearly operating system reviews. In many embodiments, the centralized service may prompt a customer to schedule future services when the customer initially orders a service. In all of these examples, the scheduling unit may store action items that trigger delivery of the services at the predetermined times.

In some embodiments, the automated service delivery unit delivers resources in response to predetermined events. In some embodiments, the customer designates the events. For example, the customer may configure her account to accept recommended services from alerts that optimize laptop performance. As a result, whenever the agent 307 and centralized service 110 generate alerts diagnosing hard drive fragmentation, a threshold number of temporary and start-up files, or spyware processes consuming a threshold level of processor capacity, the automated service delivery unit delivers services to defragment the hard drive and delete the temporary files, start-up files, and spyware processes. In some embodiments, the automated service delivery unit may update or upgrade the laptop's anti-spyware software. In another example, the customer may configure her account to accept updates for software installed on devices 101. This setting may authorize the automated service delivery unit to deliver new versions of software or patches whenever the service compiler learns of their releases.

In other embodiments, the automated service delivery unit learns from customer behavior to identify the events. In one example, the centralized service 110 may observe that the customer has accepted recommended services related to anti-virus and malware protection for a predetermined number of alerts. In response, the automated service delivery unit may create a rule to deliver anti-virus and malware protection services automatically without first requesting the customer's consent. The automated service delivery unit may create the rule even if the customer's account does not explicitly authorize automatic service delivery under any conditions, although in some embodiments, lack of authority for automatic service delivery may bar the automated service delivery from creating any behavior-based rules.

In some embodiments, the automated service delivery unit delivers resources according to the centralized service's policies. In one embodiment, the centralized service may deliver resources whenever the device malfunctions. For example, an agent 307 may inform the service whenever a device crashes, freezes, or reboots. The automated service delivery unit may deliver resources to identify and repair the source of malfunction. In another example, an agent 307 may inform the service whenever a component fails. The automated service delivery unit may order a replacement component and communicate with the customer to schedule an installation appointment.

In various embodiments, the centralized service 110 may include an intelligent routing unit that connects devices with resources. The intelligent routing unit may receive and process requests from agents 307 to access resources, and processing the requests may connect agents 307 with the requested resources. In some embodiments, the intelligent routing unit processes a request by storing the network address associated with the requesting agent 307 and determining a network address associated with the requested resource. The unit may communicate with the requested resource over a network to deliver the resource to the centralized service. The centralized service may then deliver the resource to the requesting agent. The intelligent routing unit may include an intelligent switch that connects devices 101 with remote technicians 115, as will be explained in more detail below.

In various embodiments, the centralized service 110 may include a quality control platform. In some embodiments, the platform maintains and monitors the quality of the resources being delivered. For example, the platform may analyze common elements among the resources to assess their performance. In many embodiments, the platform may review the quality of the automated service delivery. For example, the platform may assess the services delivered automatically to determine the accuracy and appropriateness of the deliveries. The platform may generate quality reports regarding any type or form of assessment. The reports may compare the assessments against service level thresholds of the centralized service 110. In some embodiments, the platform may respond to the assessments through escalation, whereas in other embodiments, the platform may respond with remedial action. In further embodiments, the reports may compare the assessment against terms in service level agreements between the centralized service 110 and the third parties providing the services. The reports may summarize discrepancies between the assessments and the terms.

Referring still to FIG. 3, in greater detail, the centralized service 110 may provide access to any type and form of resource, which may be in the form of labor or a service. The centralized service 110 may provide access to proprietary or licensed resources. The centralized service 110 may provide access to third party resources. The resources may be people-based, computer-based, or a combination thereof.

Resources provided by the centralized service 110 may offer services to install, configure, or provide updates (e.g., new versions, patches) to software, or any combination thereof. Resources provided by the centralized service 110 may provide training for software applications. Resources provided by the centralized service 110 may perform device maintenance and tune-ups. Resources provided by the centralized service 110 may provide security-related support. For example, a resource may clean devices of spyware, install anti-virus software, or review anti-virus definition. In other examples, a resource may check and enable controls regarding encryption, file sharing, and firewalls. In additional examples, a resource may provide privacy-related support. The resource may erase browser histories and cookies, as well as any other information related to customer activity (e.g., frequently visited websites stored in caches, auto-complete parameters, document histories, messaging service conversations).

A resource may provide back-up services. Such back-up services may store a copy of the device's contents on the centralized service or associated locations, and the back-up services may periodically deliver a hardcopy of the backed-up data to the customer's mailing address. A resource may provide data transfer storages. In some embodiments, an agent 307 on one device may transmit data on the device to the centralized service 110, and the centralized service 110 may transmit the data to another device 101 associated with the customer account. In another embodiment, the resource sends a hardcopy of the data to the customer's mailing address in any medium that permits easy transfer of data to another device (e.g., CD).

The centralized service 110 may connect customers with pools of labor. In some embodiments, the customers may complete work order forms to access the pools of labor, and in other embodiments, agents 307 on devices 101 may initiate the process of scheduling appointments for labor-related tasks. In some examples, customers may schedule appointments for service personnel to physically move systems (e.g., relocate a home office to another location, either on- or off-site), install new hardware components, set up cable service, set up and configure a multi-device home network system, or any other task that requires manual labor. In other examples, agents 305 may detect component failure and generate alerts to order a replacement component and schedule an appointment for component installation. In additional embodiments, the centralized service 110 may connect devices to remote technicians 115. The remote technicians 115 may launch remote desktop applications to access a device 101. The remote technicians may then install software, troubleshoot problems, provide routine maintenance, or execute any other support task known in the art. The remote technicians may report the status of any labor-related task back to the centralized service 110.

Figure 4:
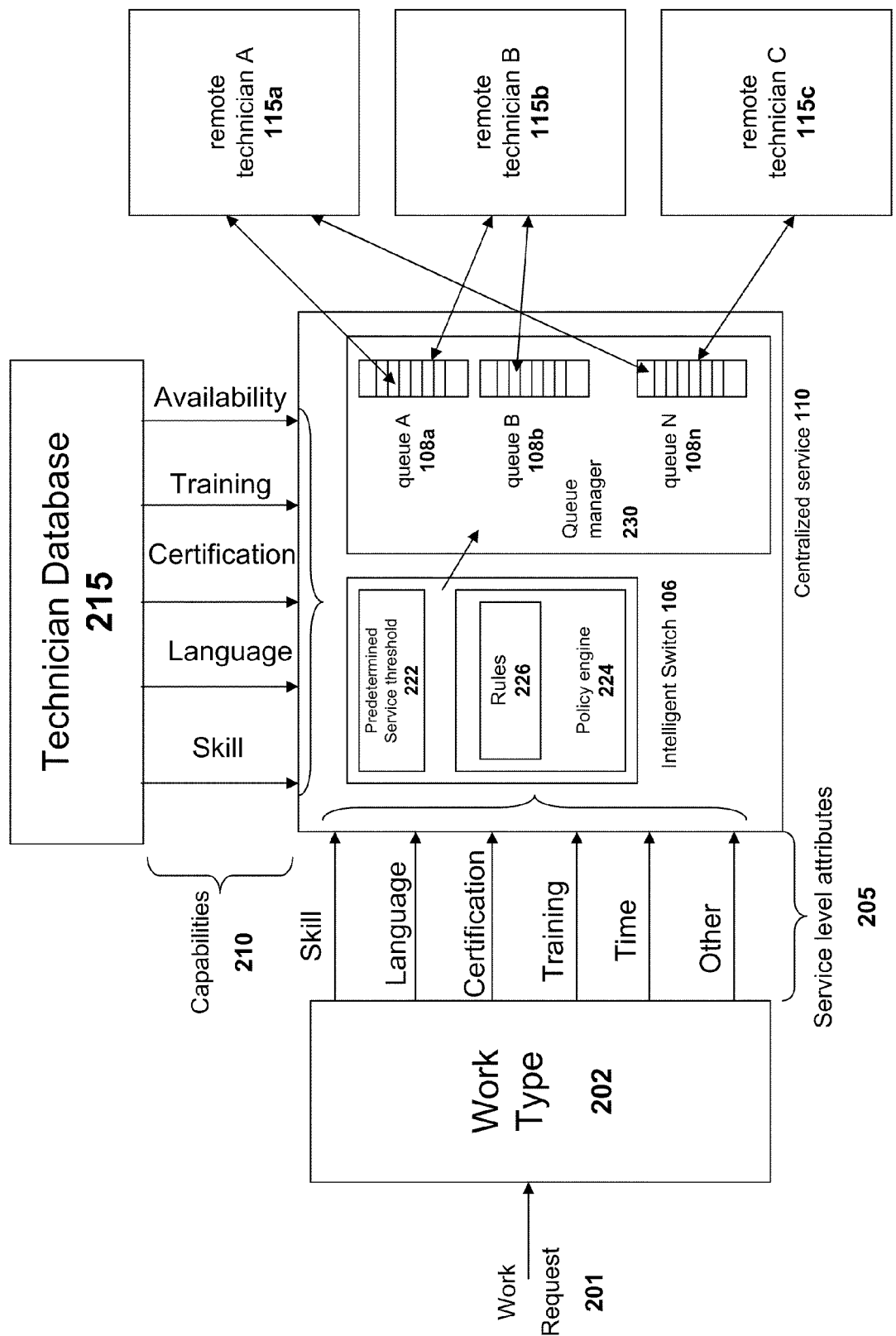
FIG. 4 is a block diagram that depicts an embodiment of allocating a service request to a remote technician by an intelligent routing unit on a centralized service.

Referring now to FIG. 4, a block diagram depicting an embodiment of a centralized service for allocating a service request to a remote technician is shown and depicted. In one embodiment, the centralized service receives a request for work 201. A work type 202 is determined from the work request 201 to identify one or more service level attributes 205 required to service the work request 201. In another embodiment, the centralized service communicates with a technician database 215 to determine capabilities 210 of technicians available to service the work request. In still another embodiment, an intelligent switch 106 routes the incoming work request 201 to a queue 108a of a plurality of queues 108a-108n (108 in general). In yet another embodiment, the intelligent switch 106 matches the service level attributes 205 of the work request 201 with the capabilities 210 of the remote technicians 115 to determine a remote technician 115a suited to service the work request 201 at a predetermined service level 222. In one embodiment, the intelligent switch 106 includes a policy engine 224 that communicates with a set of rules 226 to perform the matching. In a further embodiment a queue manager 230 manages allocation and moving of requests between the plurality of queues 108.

In one embodiment, the Intelligent Switch 106 comprises any type and form of mechanism and interface for connecting, dispatching, identifying and managing the flow of work from a consumer outlet 103 to a remote technician 115. In another embodiment, the Intelligent Switch 106 may comprise software, hardware or any combination of software and hardware. In some embodiments, the Intelligent Switch 106 includes dispatching and/or scheduling logic, functions and operations to identify and select the most appropriate technician and then pass the connection to the computer so the service may be performed. In another embodiment, the Intelligent Switch 106 may have information on which technicians 115 are logged in and currently available and the skill sets, capabilities 210 and/or knowledge that they have and type of work or service they may perform. In some embodiments, the Intelligent Switch 106 tracks in real-time which technicians are available and which technicians are currently performing a service, and for which device 101. In still another embodiment, the Intelligent Switch 106 has, obtains or maintains profiles for each of the remote technicians 115. A profile identifies the technician's technical capabilities, certifications, types of service or work authorized or assigned to perform, and/or performance information and statistics for past service work. In one embodiment, the technician profiles are stored in a technician database 215 in communication with the centralized service 110.

A work type 202 comprises any type and form of information, data or identification of the work to be performed in response to the work request 201. In one embodiment, a work type 202 is identified from the incoming work request 201. In another embodiment, the work type identification includes identifying one or more service level attributes 205 from the work request 201. In still another embodiment, the service level attributes 205 include but are not limited to one or more of the following: a level of skill, a certification or a level of training to perform the type of work on the device at the predetermined service threshold. In another embodiment, the service level attributes 205 include but are not limited to a language, location or time to perform the type of work on the device at the predetermined service threshold. In yet another embodiment, a service level attribute 205 may include one or more sub-attributes derived from one or more service level attributes 205. In a further embodiment, a service level attribute may be a function of one or more service level attributes 205. In one embodiment one or more service level attributes 205 of a work type 202 may be determined using any algorithm or qualitative and/or quantitative analysis on the work request 201. In another embodiment, the service level attributes are explicitly specified in the work request 201. In still another embodiment, the service level attributes 205 are encoded in the work request 201.

In one embodiment, the technician database 215 stores the profiles of one or more remote technician 115. The technician database 215, generally also referred to as data source, may comprise any type and form of data. In one embodiment, the technician database 215 comprises any type and form of relational database, non-relational database, object database, or object-oriented database. In some embodiments, the technician database 215 comprises any of the database products manufactured by Oracle of Redwood Shores, Calif. In another example, the technician database 215 comprises any of the versions of Microsoft SQL Server manufactured by Microsoft Corporation of Redmond, Wash. In one embodiment, the technician database 215 provides an Open Database Connectivity (ODBC) interface for accessing the database. In another embodiment, the technician database 215 comprises a server farm of databases. In some embodiments, the technician database 215 comprises a database cluster.

In other embodiments, the technician database 215 comprises a file, such as a CSV (command separated) formatted file. In another embodiment, the technician database 215 comprises a file having fields or values delimited in any manner by using fixed length field or any predetermined field or value delimiters. The file may have a structure, format, and/or content readable and understandable by the centralized service 110, or any portion thereof. In other embodiments, the technician database 215 includes an application, program, software, service, process or task providing access to data. The technician database 215 may provide any type and form of application programming interface (API), such as an XML, object, or web-service based interface for accessing or providing data.

A capability 210 of a remote technician 115 comprises any type and form of information, data and identification related to one or more of a background, skill level, knowledge, training, experience, certification and any other attribute of the technician 115. In one embodiment the technician profiles identify the capabilities 210 of each of the one or more remote technicians 115. In another embodiment, the capabilities 210 of a remote technician may include but are not limited to one or more of the following: skill set, language spoken, certifications, training received, availability and any other attribute as apparent to one ordinarily skilled in the art. In yet another embodiment, a capability 210 of a remote technician 115 may be a function of one or more capabilities 210. In one embodiment, the capabilities 210 of a remote technician 115 may include an attribute derived from a performance history of the technician 115. In another embodiment, the capabilities 210 of a remote technician 115 may be classified according to one or more different attributes such as work type, customer type, interaction with a specific customer and any other attribute. In still another embodiment, a remote technician 115 acquires a capability 210 by testing out at a certain level of certification. In one embodiment, the remote technician is certified for a skill or level of skill by passing any type and form of testing or certification. In yet another embodiment, if a technician 115 with valid certification is not available, a related or previous certification may be considered as a capability 210. For example, if a technician with currently valid certification is not available, a substantially recently expired certification may be considered as a capability 210. In some embodiments, a technician's certification may become obsolete, old or no longer valid. In one case, although the technician's certification is not current, the technician may be selected by the centralized service for that task based on previous certification.

In one embodiment, the Intelligent Switch 106 matches the service level attributes 205 with the capabilities 210 of the technicians 115. In another embodiment, the Intelligent Switch communicates with the technician database 215 to identify the capabilities 210 of one or more remote technicians 115. In still another embodiment the service level attributes 205 are matched to capabilities 210 by the Intelligent Switch 106 based on an algorithm. In yet another embodiment, each of the service level attributes 205 and/or the capabilities are assigned weights by the centralized service 110 in communication with the policy engine 224. In one embodiment, the Intelligent Switch 106 executes a learning algorithm to match the service level attributes 205 to the capabilities 210. In another embodiment, the Intelligent Switch 106 uses any algorithm, software, hardware or a combination thereof to match the service level attributes 205 to the capabilities 210. In still another embodiment, the service level attributes 205 and the capabilities 210 are matched to determine a technician 115 substantially suited to service a work request 201.

In some embodiments, the service level attribute of a level of skill may be matched to a skill level of a remote technician 115. In one of these embodiments, a skill may represent a general area of expertise such as hardware, software or networks. In another of these embodiments, a skill may represent more focused expertise in any hardware related area such as motherboards, graphics cards, monitors or network cards. In still another of these embodiments, a skill may represent a focused expertise in a software related area such as databases, anti-virus software, firewalls and operating systems.

In other embodiments, the service level attribute of language may be matched to a corresponding language capability of a remote technician 115. In one embodiment, a language may represent a spoken and/or written language such as English, Chinese, Spanish or Hindi. In another embodiment, a language may be a computer language such as C, C++, Java, HTML or Pascal. In still another embodiment, a language may be any form of communication between two individuals such as sign language.

In still other embodiments, service level attributes such as certification and/or level of training are matched to corresponding capabilities of the remote technicians 115. In one embodiment, a certification may be from an organization or a company such as Cisco Certified Network Associate (CCNA) certifications from Cisco Systems Inc. of San Jose, Calif. or Microsoft Certified Technology Specialist (MCTS), Microsoft Certified Professional Developer (MCPD), Microsoft Certified IT Professional (MCITP) and Microsoft Certified Architect (MCA) certifications from Microsoft Corporation of Redmond, Wash. In other embodiments, a certification may be one or more of an authorization, an endorsement, a promotion, a validation and an authentication from any company, organization, institution or individual as apparent to one skilled in the art. In one embodiment, a training may be a formal education received in an area of concentration. In another embodiment, a training may represent hands on experience in a related field. In still other embodiments, a training may represent means for developing a skill and/or expertise in one or more areas.

In yet other embodiments, a service level attribute of time is matched to a corresponding capability of a remote technician 115. In one embodiment, time may be a service level attribute such as the time the work request is received at the centralized service 110. In another embodiment, a time may represent a capability of a remote technician 115 such as a window of availability. In other embodiments, a time may represent one or more of service level attributes and/or capabilities such as maximum/minimum turn-around time, maximum/minimum waiting time and any other related time as apparent to one ordinarily skilled in the art. In still another embodiment, the time may represent a period by which a technician executes a task at a predetermined service threshold 222. For example, a technician may be selected based on average historical times to execute one or more support tasks or any statistical temporal measurement of task execution. In some embodiment, the centralized services selects and assigns work to technicians based on their speed of execution, such as indicated by average task times.

In one embodiment, the Intelligent Switch 106 determines the technician suitable to service a work request 201 to meet a predetermined service threshold 222. A predetermined service threshold is any type and form of a metric used to identify one or more qualitative and/or quantitative aspect related to performing a service, such as any measurable element of the service. In one embodiment, the pre determined service threshold is a quantitative metric such as turnaround time. In another embodiment, the service threshold is a qualitative metric such as customer satisfaction. In yet another embodiment, the service threshold 222 is considered as a service level attribute 205 in determining a technician to service a work request 201. In one embodiment, the service threshold 222 may be specified as a part of the work request 201. In another embodiment, a technician 115 is selected by the Intelligent Switch 106 to optimize the probability of meeting the service threshold 222. In other embodiments, the service threshold 222 may be one or more characteristics and/or capabilities of the remote technician 115 such as age, language spoken, accent, dialect, sex, ethnicity or any other characteristics for which a customer may indicate a preference. Via customer selection or profile, a technician may be selected based on any number of non-technical characteristics.

In some embodiments, the Intelligent Switch 106 includes a policy engine 224. In another embodiment, the policy engine 224 is driven by a set of rules 226. In one embodiment, the policy engine 224 may include, for example, an intelligent statistical engine or other programmable application(s). In another embodiment, the policy engine 224 provides a configuration mechanism to allow a user to identifying, specify, define or configure a matching policy. The policy engine 224, in some embodiments, also has access to memory to support data structures such as lookup tables or hash tables to enable user-selected matching policies. In other embodiments, the policy engine 224 may comprise a set of rules 226 including any logic, rules, functions or operations to determine and provide access, control and management of service level attributes 205 and capabilities 210 being matched by the intelligent switch 106.

In one embodiment, the Intelligent Switch 106 includes the Citrix Online GoToAssist support portal. In other embodiments, the Intelligent Switch may include any online support systems from WebEx Communications, LogMeIn or Microsoft. In some embodiments, the Intelligent Switch 106 includes software, functions or logic that call an application programming interface (API) to the support portal and software system to perform desired functionality and operations described herein. In one embodiment, the Intelligent Switch 106 is designed and constructed to forward work to specific agents or technical resources or pools of agents/technical resources based upon information received via the Internet Interface, such as answers to questions on a web form.

In one embodiment, the Intelligent Switch 106 may include any type and form of logic, functions or executable instructions to organize support and/or work request into queues 108 and to dispatch or schedule such request to technicians 115. In another embodiment, the Intelligent Switch 106 may identify, arrange or organize queues 108a-108n (108 in general) in any manner, scheme or into any type and form of categories. In some embodiments, the queues 108 may be organized by consumer outlet or locations thereof. In other embodiments, the queues 108 may be organized by groups of consumer outlets 103, such as for a retail chain. In another embodiment, the queues 108 may be organized by the type of service requested and/or the nature of the problem. For example, queues 108 may be organized for application installation services, checkup and virus scan services or software or operating system upgrades. In still other embodiments, the queues 108 may be organized by the type or category of software, application or operating system. In another embodiment, the queues 108 may be organized by type of device, such as computing, MP3, printer, etc. In further embodiments, the queues may be organized by the manufacturer or brand of the device. In one embodiment, the queues 108 may be organized or arranged by groups of one or more technicians 115. In another embodiment, the queues may be arranged by geographic locations of one or more technicians.

The scheduling and/or dispatching functionality of the Intelligent Switch 106 uses any type and form of logic, algorithm or scheme to match work from a queue to a suitable technician. In one embodiment, the Intelligent Switch determines the next available remote technician 115 to give the work from a queue 108a or any of the queues 108. In some embodiments, the Intelligent Switch 106 characterizes the work type 202 based on one or more service level attributes 205 that are required or desired to perform the work 201. In another embodiment, the Intelligent Switch 106 has knowledge of capabilities 210 of the remote technicians 115, such as from profiles stored in the technician database 215. In still another embodiment, the Intelligent Switch 106 determines and selects a technician 115a suited to service the work request by matching the service level attributes 205 to the capabilities 210 of the technicians. In one embodiment, the Intelligent Switch 106 selects a technician 115a best suited to service the work request. Upon this determination, in one embodiment, the Intelligent Switch 106 delivers or informs the matched or selected technician 115a of the item he or she should work on next. If work type 202 is not known then the Intelligent Switch 106 may assign the queued work to a technical resource that is capable of diagnosing problem for later redirect to the most appropriate technician. For example, after diagnosing the problem, the technical resource may resubmit the work to the Intelligent Switch 106 to be assigned to a technical resource. The diagnosing technical resource may assign the work to the appropriate queue 108 or provide information from the diagnostics for the Intelligent Switch 106 to assign the work to the appropriate queue 108 or technical resource.

The Intelligent Switch 106 uses any rules and/or algorithm to select a technician suited to service a work request. In one embodiment, the service level attributes 205 and/or the capabilities may be ordered based on a priority of requirement. In another embodiment, each attribute 205 and/or capability 210 is assigned a weight prior to the selection. In still another embodiment, one or more of the attributes 205 and/or the capabilities 210 may be marked as essential. In such an embodiment, if a suited technician satisfying the essential capability is not available, the work request 201 is put on hold till a suited technician becomes available. In one embodiment, if the Intelligent Switch 106 cannot select a suited technician 115, a communication is sent out to all available technicians 115 to query if any technician is capable of servicing the work request 201. In one embodiment, one service level attribute is matched to a corresponding capability to select a remote technician. In another attribute, a plurality of service level attributes is matched to a plurality of corresponding capabilities to select a remote technician. In some embodiments, a multi-level process is employed to select a remote technician. In one of these embodiments, in one level, one or more remote technicians are selected as a first group based on matching one or more high priority attributes to one or more corresponding capabilities. In another of these embodiments, in another level, one or more remote technicians are selected from the first group based on matching one or more lower priority attributes to one or more corresponding capabilities. In some embodiments, one or more technicians are selected based on weights assigned to one or more skills and capabilities. For example, a technician A may have skill 1, skill 2 and skill 3 at different levels. Technician 2 may have skill 4 and skills 1-3 at lower levels than that of technician 1. If for a certain task, skill 4 has a very high weight (e.g. it is mandatory and not optional) while skills 1-3 have relatively low weights, technician 2 may be selected over technician 1. As another example, if a task requires a high weight on one or more of skills 1-3 and a low weight on skill 4, technician 1 may be selected over technician 2.

In one embodiment, the remote technical support system technician resources are aggregated by the Intelligent Switch 106 into pools of labor which are used to resolve the issues aggregated from the customer outlets 103. Because the technical resources deliver their services remotely through networks, such as the Internet they can be located in call centers or in a distributed work environment such as a home. As long as the technical resource has access to the network or the Internet they can provide services for customers.

In one embodiment, the Intelligent Switch 106 may include any type and form of logic, function, operations or executable instructions to perform load balancing between one or more queues 108 and the remote technicians 115. For example, the Intelligent Switch 106 may load balance queues 108 based on the type of work and the capabilities 210 of available technicians. In some cases, technicians may have multiple skills sets that may be used to work on request in multiple queues. The Intelligent Switch 106 may load balance service requests or the queues to meet the predetermined service threshold 222 or metrics for a consumer outlet 103. The Intelligent Switch 106 may load balance the queues according to priority levels assigned at a consumer outlet 103. In other embodiments, the Intelligent Switch 106 may load balance queues 108 across a retailer's chain of consumer outlets 103. In yet another embodiment, the Intelligent Switch 106 may load balance queues based on geographic locations, such as for a region of consumer outlets 103. In a further embodiment, the Intelligent Switch 106 may use performance and timing metrics of work performed to load balance to remote technicians 115 based on average support resolution times based on queue type or historical time of the technician 115.

In some embodiments, the remote technical support services provided via the Intelligent Switch 106 may include any type and form of remote technical or online services, such as PlumChoice Online PC services of Billerica, Mass., FireDog services provided by CircuitCity Stores, Inc., online services provided by Support.com and tech24 at tech24.com.

Although the embodiments of the system and methods of FIG. 4 are generally described in connection with remote technicians, these systems and methods may be used for automated systems 116 and/or local labor 117 as well. Furthermore, these systems and methods may be used for intelligently and effectively deploying any combination of remote personnel, systems and/or local labor to deliver or perform a service or delivery a resource. As such, the service level attributes and capabilities may correspond to such different types of services providers. For example, there may be a database 215 comprising capabilities of onsite personnel. In another example, there may be a database 215 comprising capabilities of remote non-technical service personnel. In another example, there may be a database 215 comprising capabilities of systems, such as automated systems. In some embodiments the database(s) 215 comprise capabilities of any type of service provider described herein, such as those corresponding to FIGS. 8A-8C.

For example, the systems and methods of the centralized remote technical support services described herein may also be deployed for local onsite services. In these embodiments, the solution uses remote services technology to deliver the most appropriate trained technical resource to resolve the customer needs at the customer's home or location. The innovative application of the centralized technology discussed herein with innovative modification to skills and processes for local onsite service improves and optimizes the amount of cost required to deliver services to the home. Without the use of the technology and processes described herein, one or more technicians visits the consumer's home or location for an indeterminate period of time and for additional appointments to be scheduled when the work exceeds either the time or the skill of the one or more technicians.

By using the systems and methods described herein, the skills of the technician visiting the home may be redefined or re-scoped to be associated with connecting devices and enabling connection of the computers to a network or the Internet. The amount of time to perform these tasks is more deterministic and requires a much more focused set of skills. For example, an onsite service home service technician may be dispatched for ½ hour, hour or other predetermined time increments to perform a preliminary diagnostics and to setup up the service work to the Internet Switch, much like the store associate in the consumer outlet scenarios described above. Once the interconnection of the consumer device is complete and the device is hooked up to the Internet Switch, remote resources from the centralized service may be connected to complete all the necessary installations, configurations, training, and repairs. As such, in these embodiments, appropriate skilled resources are applied without the need to send additional technicians to the consumer's location. The onsite technician may leave to attend other service calls once the device is hooked up to the Internet Switch.

A typical example scenario for a local onsite service is that a consumer may call for help because his or her computer is slow, lost connectivity to the Internet, experiencing lots of pop-ups and or perhaps would like to install some new devices. A technician may be assigned a time-frame of 1-3 hours reserved to perform the work. When the technician arrives on site he or she may diagnose the problem, and may start with a set of tools to fix the problem and then proceed to hook the computer up to the Internet, or verify connectivity to the Internet. Once done the technician may start to install new devices and software onto the computer. Without the use of the centralized remote technical services described herein, much of the time spent on site is watching the tools fix the problems as they can take a long time to scan and automatically fix problems. In some cases, the technician may run out of time or that there will be aspects of the work that will require another visit by a technician with a different set of skills. With the user of the centralized remote technical services described herein, a predetermined amount of time may be set for the technician for an onsite visit, such as a 1 hour appointment. In that time-period the technician may perform a diagnostics and connect and configure the device to be connected to the Internet Switch and pool of remote technical resources. The onsite technician may go to another place to do the same work—another home visit for a predetermined amount of time, after leaving the computer connected to the centralized remote technical support service. At that point, the computer may be assigned from a queue to a remote technician to perform the desired service based on the onsite technician's diagnostics, description of the problem or information submitted to the Internet Switch. The remote technician for example may clean and update the software and configuration of the computer and install any new devices. In addition, the remote technician may deliver training to the consumer at his home, such as live one on one training. If the remote technician performing the service is not the best or appropriate resource to perform the service, the connection to the consumer's computer may be transferred electronically and real-time to the next appropriate technician with out the need to reschedule an onsite visit.

Figure 6:
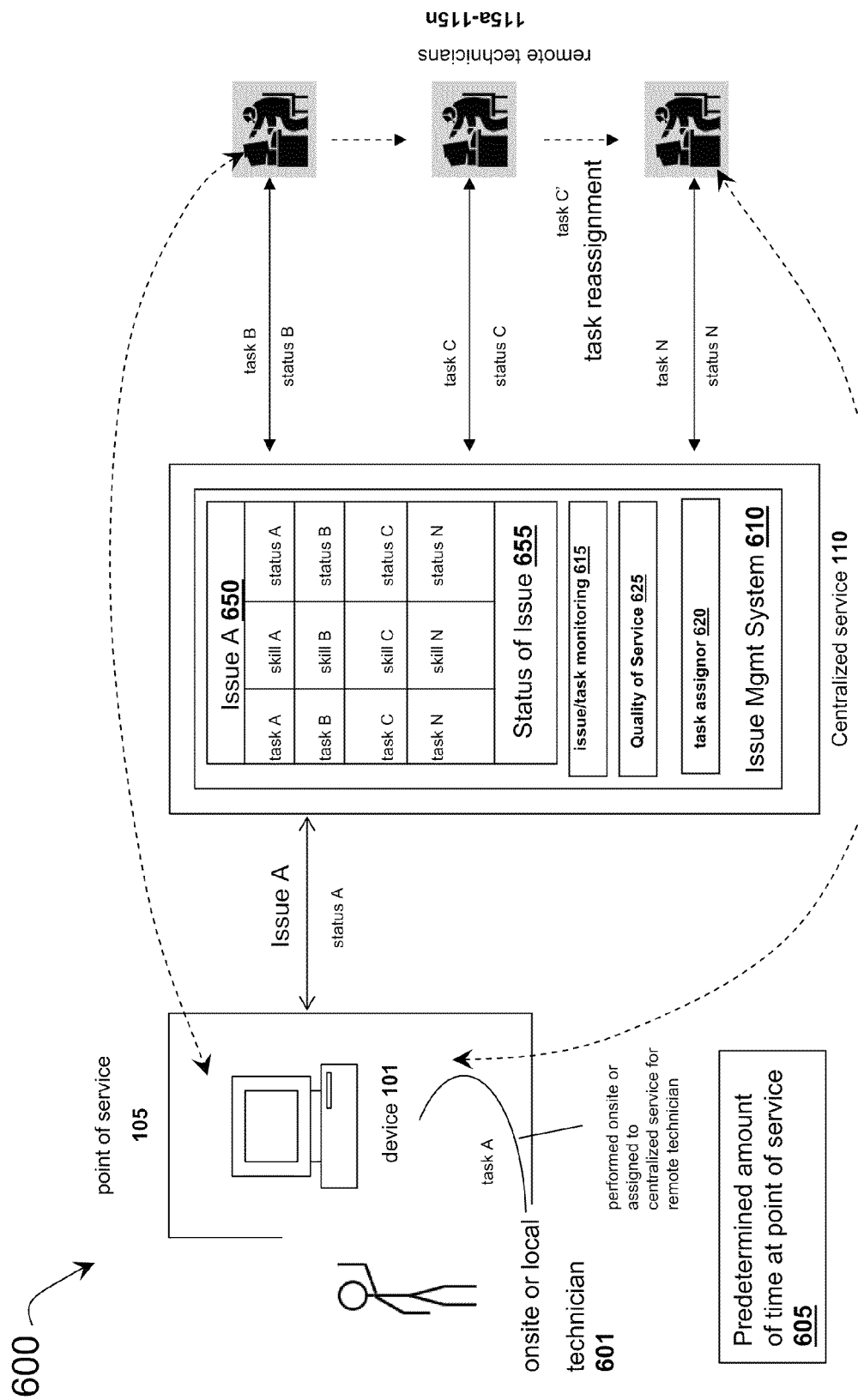
FIG. 6 is a block diagram of an embodiment of an environment to provide hybrid delivery of remote and local technical support via a centralized service.

Referring now to FIG. 6, a block diagram of an embodiment of an environment 600 to provide hybrid delivery of remote and local technical support via a centralized service is shown and described. In such an environment, an onsite or local technician 601 is assigned to provide service to a device 101 located at a point of service 105. The local technician 601 provides service to the device 101 for a predetermined time 605. An issue 650 with the device 101 is identified and communicated to the centralized service 110. The centralized service 110 includes an issue management system 610 that manages one or more issues 650. Each issue 650 may include one or more tasks that require one or more skills. A status 655 of the issue 650 is communicated to the point of service from the centralized service 110. The status 655 may be a function of one or more statuses of the one or more tasks. One or more tasks are assigned by the centralized service 110 to one or more remote technicians (115a-115n). The remote technicians 115 attend to the tasks and communicate a status for each task back to the centralized service 110. The issue management system 610 may include one or more of an issue/task monitoring unit 615, a Quality of Service (QoS) monitor 625 and a task assignor 620.

The point of service 105 may be any type and form of premise at any location. In one embodiment, the premise may be an outlet 103 of a retailer 102. In another embodiment, the premise may be a home. In still another embodiment, the premise may be an office or an office located in a home. In yet another embodiment, the premise may be a store or any other location where a consumer 301 has deployed the device 101. In a further embodiment, the premise may be a company. In some embodiments, the point of service includes any desktop computer or any device located at any type and form of company, business or enterprise. In some embodiments, the premise may be a mobile location. In one of these embodiments, the premise may be any vehicle such as a car, a bus, a truck, a train, a plane or a boat.

In some embodiments, the local technician 601 is an employee, contractor or any other person related to a company which provides onsite support services. An example of such a company is GEEK SQUAD, a subsidiary of BEST BUY of Richfield, Minn. The local technician 601 provides onsite technical support to the device 101. In one embodiment, the local technician 601 is a store associate 305 at an outlet 103 of a retailer 102. In another embodiment, the local technician 601 is a traveling technician deployed at the point of service 105 to provide technical support for the device 101. In one embodiment, the local technician 601 is deployed by a customer support group at an outlet 103 or any other location. In another embodiment, the technician 601 is deployed by the centralized service 110. In still another embodiment, the technician 601 is deployed responsive to receiving a request for technical support at one of the point of service 105, the outlet 103 or the centralized service 110. In yet another embodiment, the technician 601 is chosen based on the request for technical support.

In one embodiment, the local technician 601 receives a communication to provide technical support on the device 101 at the point of service 105. The communication may be generated by any person or automated service at one of a point of service 105, an outlet 103 or the centralized service 110. In another embodiment, the communication may include details based on the request for technical support including but not limited to: nature of the problem, time, date, details of the device 101, history of support provided, name or identification of one or more technicians who previously serviced the device 101, location of the device 101, expected turnaround time and one or more skills required to service the request. The communication may be received by the technician 601 in many ways. In one embodiment, the communication is sent to a mobile device of the technician 601 via one or more networks 104. In another embodiment, the mobile device may include a smartphone, a personal digital assistant (PDA), a laptop or any other mobile device as apparent to one skilled in the art. In still another embodiment, the technician 601 may receive the communication via email, telephone or directly from another individual.

In one embodiment, the technician 601 spends a predetermined amount of time 605 at the point of service 105 in providing technical support to the device 101. In another embodiment, the predetermined amount of time 605 is a fixed amount of time. The predetermined amount of time 605 may be fixed, set or established by any person. In still another embodiment, the predetermined amount of time 605 may be fixed, set or established by an automated service. In one embodiment, the predetermined amount of time 605 is fixed, set or established by the centralized service 110. In another embodiment, the predetermined amount of time 605 is fixed, set or established by the customer. In still another embodiment, the predetermined amount of time 605 is set by the local technician 601. In yet another embodiment, the predetermined amount of time 605 is pre-set by the service provider providing the services described herein. In one embodiment, the predetermined amount of time 605 may be set at any predetermined date, time or schedule. In another embodiment, the predetermined amount of time 605 may be set on the basis of an availability of the local technician 605. In still another embodiment, the predetermined amount of time 605 is an amount of time set or established depending on one or more of nature of the problem, availability of the technician, demand for the technician, nature of the device and feasibility of onsite resolution. In yet another embodiment, the time 605 may be extended till a problem is resolved. In some embodiments, the predetermined amount of time 605 may be reset, re-established or re-fixed depending on one or more of nature of the problem, availability of the technician, demand for the technician, nature of the device, feasibility of onsite resolution and status of resolution. In other embodiments, if the problem is not resolved in the predetermined amount of time 605, the technician 601 refers the problem to the centralized service 110 for resolution. In still other embodiments, the predetermined amount of time 605 can be in any time units including seconds, minutes, hours and days.

The predetermined amount of onsite support time may be based on, caused by or otherwise determined based on the local technician having or applying a limited scope of skills to the issue and/or by limiting the scope of work of the local technicians to a subset of tasks towards resolving the issue. In one embodiment, the predetermined amount of time 605 is enabled by restricting the tasks performed by the local technician 601. In another embodiment, the local technician 601 performs a subset of tasks required for resolving an issue. In still another embodiment, the predetermined amount of time 605 is fixed, set or established on the basis of a predetermined set of tasks that the local technician 601 performs. In yet another embodiment, the predetermined amount of time 605 is determined on the basis of time needed by the local technician 601 to perform the predetermined set of tasks.

In some embodiments, a local technician is deployed having a predetermined or limited set of skills or certification. For example, the local technician may be skilled or certified in an aspect of network connectivity and/or Internet connection configuration or diagnostics of the same. Onsite, the local technician focuses on resolving any issue related to network connectivity in order to establish connectivity to and/or service from the centralized service. In some embodiments, the local technicians task is limited to any one or more of the following: identifying the issue, diagnosing/resolving/establishing operation of the device to connect to a network or the Internet, connecting the device to the Internet and/or the centralized service and providing an identification of the issues and other status information to the centralized service. In another embodiment, if the technician completes the predetermined scope of tasks prior to expiration of the predetermined time period the technician may continue to work on other tasks in resolving the issue for the customer. In one embodiment, the technician may use any remaining time of the predetermined amount of time to upgrade, sell or market any products and services to the customer. In other embodiments, if the technician completes the predetermined scope of tasks prior to expiration of the predetermined time period the technician may complete his visit and go to the next appointment.

The technician 601 provides many different types of technical support to the device 101. In one embodiment, the technician 601 may replace one or more parts of the device 101. In another embodiment, the technician 601 may provide software installation and/or upgrade services to the device 101. In still another embodiment, the technician may run hardware and/or software diagnostics on the device 101. In yet another embodiment, the technician may connect the device to the centralized service for further support and/or resolution of one or more issues 650. In one embodiment, the technician 601 connects the device 101 to the centralized service via an intermediate device 101' (not shown). In another embodiment, the technician 601 installs an agent 307 on the device 101 to connect the device to the centralized system 110. In still another embodiment, the technician 601 transports the device 101 to another location such as another point of service 105 or an outlet 103 to connect the device to the centralized service 110. In a further embodiment, the technician 601 identifies one or more issues 650 for resolution of the problem and communicates the issues to the centralized service 110. In one embodiment, the local technician 601 has a limited skill set of providing connectivity to the centralized service 110. In another embodiment, the local technician 601 may have a skill set to perform one or more of the following: provide remote support, diagnose issues, provide remote connectivity, replace hardware, back up data, load operating system, install software, reload data onto the device 101, set up and configure the device 101 and integrate the device 101 into an environment. In still another embodiment, the local technician 601 may have a skill set to work within a predetermined amount of time.

The local technician 601 may communicate with the centralized service 110 using any type and form of communications and/or devices. In one embodiment, the local technician 601 logs into the centralized service 110 via the device 101. In another embodiment, the local technician 601 logs into the centralized service via a mobile device such as a smartphone, personal assistant (PDA), a BLACKBERRY device or an IPHONE. In still another embodiment, the local technician 601 uses any other laptop, desktop or computing device to log into the centralized service 110. In one embodiment, the local technician 601 records or creates a log of services provided onsite. In another embodiment, the log of services may include but are not limited to the following information: name and/or identification of the local technician, skill set of the local technician, time, nature of problem, details of the device, list of operations performed on the device, results of the operations, identification of an issue, identification of one or more tasks, status of resolution, comments, suggestions and any other information relevant to providing technical support to the device. In still another embodiment, the log of services may be created using a software agent running on the device 101 and in communication with the centralized service 110. In yet another embodiment, the log of services may be created using a web interface. In some embodiments, the centralized service 110 determines, based on the log of services, whether there is an issue that may be resolved by one or more remote technicians.

The centralized service 110 may log, record or capture in any form and format any and all activity performed, occurring or related to use of the centralized service and/or providing of support services, including but not limited to telephone communications, email communications, application use, fax communications, login/logout to device activity, and system, application and operating events. The centralized service 100 may use any type and form of timestamp or mechanism for temporal recording of activities. In some embodiments, the centralized service 110 captures the remote login session to the device to record all the activity from the point of connection to logoff. In some of these embodiments, the centralized service 110 can play back a copy of the entire support session or any portion thereof. In one embodiment, the centralized service 1100 may filter any of the recorded or logged information based on any criteria. In another embodiment, the centralized service 100 may log, record or capture any activity in resolving or support a customer's issue across multiple remote technicians and may include the activity of the local technician. The local technician may log onto the centralized service as soon as possible at the start of the service or any time during the predetermined amount of time to have the centralized service log the local technician's activities as they occur.

In some embodiments, one or more issues 650 are communicated to the centralized service 110. In one of these embodiments, the one or more issues 650 are communicated from the device 101. In another of these embodiments, the one or more issues are communicated to the centralized service 110 via one or more of the point of service 105, the local technician 601, a device of the local technician 601 and one or more intermediate devices 101' including but not limited to servers, computers, networks, hubs, routers, proxies and any other devices as apparent to one skilled in the art. In one embodiment, the issue 650 is one that cannot be resolved by the skill set of the local technician 601. In another embodiment, the issue 650 is one that cannot be resolved by the local technician 601 within the predetermined amount of time 605. In still another embodiment, the issue 650 cannot be resolved by the local technician 601 with the resources available to the technician 601. In yet another embodiment, the issue 650 requires further support to the service performed onsite by the local technician 601. In some embodiments, the issue includes multiple tasks one or more of which cannot be performed by the local technician 601. In one of these embodiments, one or more of the multiple tasks cannot be performed by the local technician 601 within the predetermined amount of time 605.

In one embodiment, the centralized service 110 includes an issue management system 610 to manage the one or more issues 650. The issue management system 610 provides one or more functionalities to manage and/or resolve the one or more issues 650. In one embodiment, the issue management system 610 includes an issue/task monitoring unit 615 that monitors the status of one more issue and/or tasks related to an issue 650. In another embodiment, the issue management system 610 includes a quality of service (QoS) monitor 625 that provides quality control to one or more functionalities of the system 610. In still another embodiment, the issue management system 610 includes a task assignor 620 that manages assignment and/or reassignment of one or more tasks. In some embodiments, the issue management system 610 is implemented as a software. In one of these embodiments, the issue management system 610 includes one or more applications and/or programs. In another of these embodiments, the issue management system 610 executes on one or more devices housing the centralized service 110. In another embodiment, the issue management system 610 is implemented as a hardware unit. In still another embodiment, the issue management unit 610 is implemented as a distributed service/software over one or more hardware units. In still another embodiment, the issue management unit 610 includes both hardware and software components. In yet other embodiments, the issue management unit 610 may include any file, library, executable code, rule engine, database and other software as apparent to one skilled in the art. In some embodiments, the issue management unit communicates with one or more local technicians 601 and one or more remote technicians. In one of these embodiments, the issue management unit includes an interface to communicate with the one or more technicians.

In one embodiment, the issue management system 610 includes the issue/task monitoring unit 615. In another embodiment, the issue/task monitoring unit 615 monitors the statuses of one or more tasks. In still another embodiment, the issue/task monitoring unit 615 communicates the status of issue 655 to one of the device 101, the point of service 105 or a device of the local technician 601. The issue/task monitoring unit 615 may monitor the statuses of the tasks and/or the issue in many ways. In one embodiment, updates about the statuses of the one or more tasks may be pushed to the issue/task monitoring unit as they are received at the centralized unit 110. In another embodiment, the issue/task monitoring unit 615 polls the statuses of the tasks to receive the updates. In still another embodiment, the issue/task monitoring unit 615 communicates with the task assignor 620 and/or the quality of service monitor 625 to provide information on the status of the tasks and/or issue. In one embodiment, the issue/task monitoring unit 615 is implemented as an integrated part of the issue management system 610. In another embodiment, the issue/task monitoring unit 615 is implemented as a separate software and/or hardware unit. For example, the issue/task monitoring unit 615 may be implemented as a function or subroutine. In still other embodiments, execution of the software for the issue monitoring unit 615 may be distributed over one or more hardware units.

The task assignor 620 manages assigning of the one or more tasks to one or more remote technicians 115a-115n (115 in general). In one embodiment, the task assignor 620 is a part of the intelligent switch 106 as described with reference to FIG. 2. In another embodiment, the task assignor 620 includes a policy engine 224 that operates on the basis of a set of rules 226. In still another embodiment, the task assignor 620 communicates with the technician database 215 to choose one or more remote technicians 115 for one or more tasks. In yet another embodiment, the task assignor 620 assigns a technician 115 to a task on the basis of one or more capabilities 210 of the technician 115 corresponding to one or more service level attribute 205 identified for the task. In one embodiment, the task assignor 620 assigns a task to a work queue 108. In another embodiment, the task assignor 620 communicates with the queue manager 230 to manage assignment and/or reassignment of tasks to one or more queues. The technician database 215, remote technicians 115, capabilities 210, service level attributes 205, policy engine 224, rules 226, queue 108 and queue manager 230 are described with reference to FIG. 2.

In some embodiments, the task assignor 620 communicates with the issue/task monitoring unit 615 and QoS monitor 625 to manage assignment of the tasks. For example, if the issue/task monitoring unit 615 reports that a technician 115c has not updated the status of an assigned task C and/or a last update of status C indicates that task C is not being completed as expected, the task assignor 620 reassigns the whole or part of task C as task C' to another technician 115n. In other embodiments, the task assignor 620 receives feedback from the QoS monitor 625 to determine if the quality of service for a task satisfies the predetermined service threshold 222. In one embodiment, if the quality of service falls below the predetermined service threshold 222, the task assignor 620 reassigns the task to another technician. In one embodiment, the task assignor manages assignments and reassignments of local technicians 601 to provide onsite technical support.

The QoS monitor 625 may be implemented in any way and on any device. In one embodiment, the QoS monitor 625 is implemented as software and may include one or more of subroutines, files, libraries, and executable codes. In another embodiment, the QoS monitor 625 may include one or more parameters defining the predetermined service threshold 222. In still another embodiment, the QoS monitor 625 includes one or more hardware units. In some embodiments, the QoS monitor 625 executes a plurality of logical, mathematical and Boolean operations. In one of these embodiments, the QoS monitor 625 performs comparisons and/or calculations on one or more attributes of the tasks and one or more attributes and/or parameters related to the predetermined service threshold 222.

One or more issues 650 may be identified for the device 101. In one embodiment, the one or more issues are identified by the local technician 601. In another embodiment, the one or more issues are identified by the customer. In still another embodiment, the one or more issues are identified by the centralized service 110. In yet another embodiment, one or more of the centralized service 110, the customer and the local technician 601 participate in identifying the one or more issues 650. In one embodiment, the one or more issues 650 are addressed and/or resolved to complete the request for technical support. An issue 650 may include several attributes. In one embodiment, resolving an issue 650 may include completion or execution of one or more tasks (task A, task B, task C, task N etc.). In another embodiment, execution of each task may require a separate skill. For example completing or executing task A may require skill A, completing task B may require skill B and completing task C may require skill C. In still another embodiment, one or more tasks may require one skill or a combination of skills. As an example, task A and task N may require skill C and task C may require one or more of skill A, skill B and skill N. In some embodiments, each of the tasks has a status. In one of these embodiments, the status 655 of the issue 650 may depend on one or more of the task statuses.

In one embodiment, each of the tasks has to be completed to resolve the issue 650. In another embodiment, resolution of the issue 650 may include completion of one or more essential tasks and one or more optional tasks. In still another embodiment, the issue 650 may be resolved via completion of the one or more essential tasks. In yet another embodiment, completion of one or more tasks may be dependent on completion of one or more other tasks. As an example, completing task A may be dependent on completion of tasks B and C. In such cases the tasks are completed in a predetermined order. In a further embodiment, the tasks may be completed in any order. In some embodiments, all or some of the tasks are prioritized.

In some embodiments, the tasks for resolving the issue 650 are determined by the local technician 601. In other embodiments, the tasks for resolving the issue 650 are determined by the centralized service 110. In still other embodiments, the local technician 601 and the centralized service 110 work in conjunction to determine the tasks for resolving the issue 650. In one embodiment, the local technician 601 and/or the centralized service 110 may modify or delete one or more tasks determined by the local technician 601 and/or the centralized service 110. In another embodiment, the centralized service 110 and/or the local technician 601 determines the tasks based on one or more attributes of the issue 650. In one embodiment, one or more mathematical, statistical, logical or Boolean operations are performed by the centralized service 110 on one or more attributes of the issue 650 to determine the tasks for resolving the issue 650. In another embodiment, the tasks for resolving the issue 650 may be determined by a software agent 307 executing on the device 101. In still another embodiment, the software agent 307 may communicate with one or more of the local technician 601 and the centralized service 110 in determining the tasks. In some embodiments, one or more remote technicians determine or identify the issues of the customer with or without the local technician.

In one embodiment, the centralized service 110 identifies one or more skills required for completion of each of the tasks. In another embodiment, the centralized service 110 identifies the one or more skills based on an identification of a work type 202. In still another embodiment, the work type for each task is identified by one or more service level attributes 205. In yet another embodiment, skill is identified as a service level attribute 205. Work type 202 and service level attributes 205 are described with reference to FIG. 2.

The centralized service 110 provides one or more updates on the issue 650 by providing a status 655 of the issue 650. In one embodiment, the status 655 includes information on what percentage of the issue 650 has been resolved. In another embodiment, the status 655 may include one or more queries requiring a feedback from one of the device 101, the point of service 105 or the local technician 601. In still another embodiment, the status 655 includes identification of statuses of one or more tasks. In yet another embodiment, the status 655 identifies which tasks have been completed and/or which tasks are pending. In some embodiments, the statuses of the one or more tasks are communicated to the centralized device 110 from a corresponding remote technician 115 attending to the task. In a further embodiment, the status 655 is derived from the one or more statuses of the tasks identified to resolve the issue 650.

Figure 7:
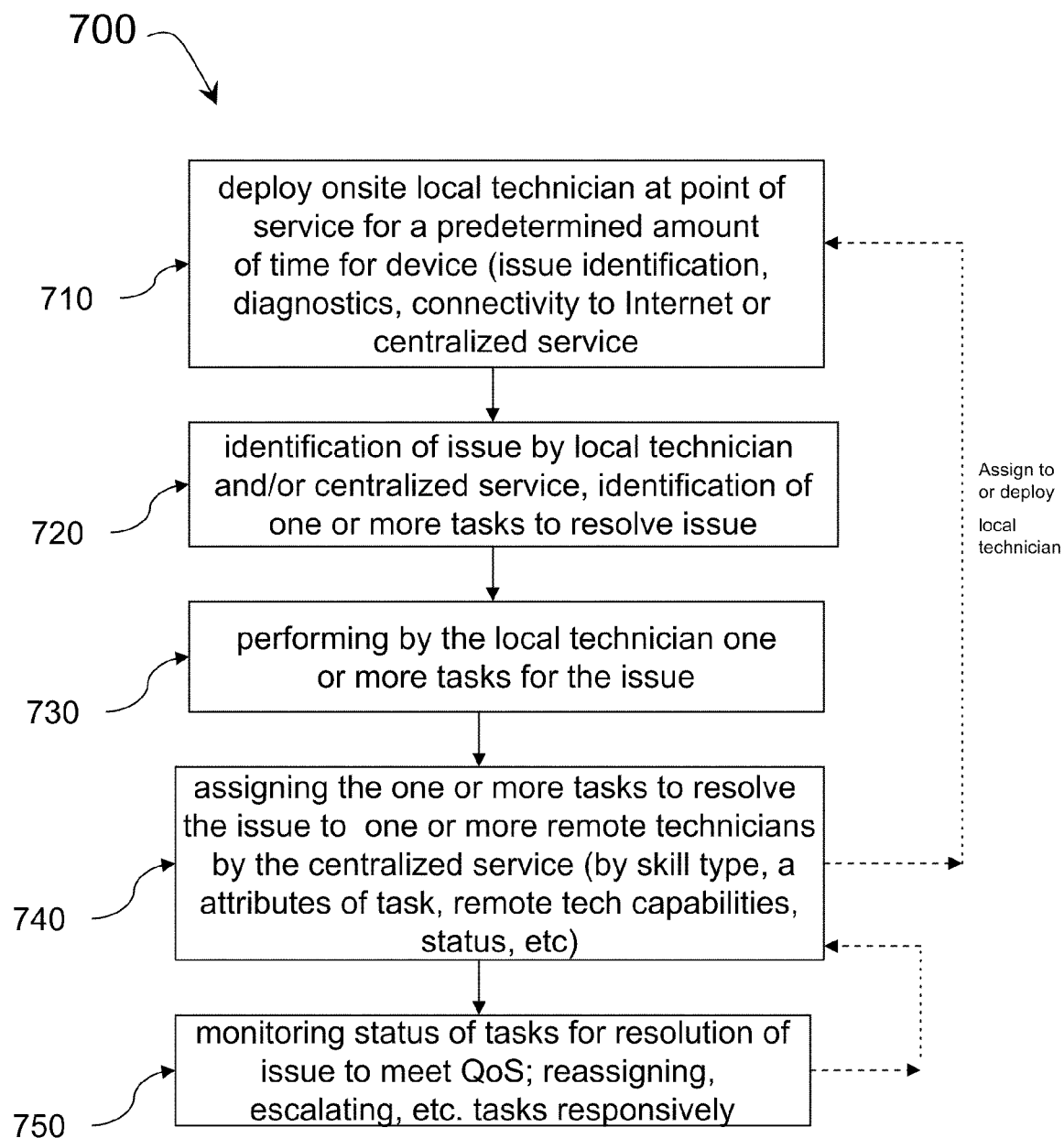
FIG. 7 is a flow diagram depicting steps of an embodiment of a method to manage hybrid delivery of remote and local technical support via a centralized service.

Referring now to FIG. 7, a flow diagram depicting steps of an embodiment of a method to provide and manage hybrid delivery of remote and local technical support via a centralized service is described. In one embodiment, the method includes deploying (step 710) a local technician at a point of service to provide onsite technical support to a device. An issue with the device and one or more tasks for resolving the issue are identified (step 720) and the local technician performs (step 730) one or more tasks for the issue. The centralized service assigns (step 740) one or more tasks to resolve the issue to one or more remote technicians and monitors (step 750) the statuses of the one or more tasks.

The local technician 601 is deployed (step 710) at the point of service 105 to perform one of a plurality of possible tasks. In one embodiment, the local technician 601 performs a diagnostic test on the device 101. In another embodiment, the technician 601 identifies one or more issues with the device 101 that are to be resolved. In still another embodiment, the technician 601 identifies one or more tasks associated with each issue. In another embodiment, the technician performs service on the device 101 to resolve one or more issues and/or tasks. In yet another embodiment, the technician 601 connects the device 101 to the centralized service 110. In one embodiment, the technician 601 checks, repairs, troubleshoots or establishes a connectivity of the device 101 to the internet and/or the centralized service. In further embodiments, the local technician 601 may perform any task or function such as the ones described with reference to FIG. 6.

In one embodiment, the technician 601 is deployed to spend a predetermined amount of time 605 at the point of service 105 in providing technical support to the device 101. The predetermined amount of time 605 is may be fixed, set or established by any person or automated service such as the centralized service 110, the customer or the local technician 601. In another embodiment, the technician 601 is deployed for the predetermined amount of time 605 as pre-set by the service provider providing the services described herein. In one embodiment, the technician 601 may be deployed at any predetermined date, time or schedule. In another embodiment, the technician 601 may be deployed on the basis of an availability of the technician 605. In still another embodiment, the technician 601 may be deployed for a predetermined amount of time 605 depending on one or more of nature of the problem, availability of the technician, demand for the technician, nature of the device and feasibility of onsite resolution. In yet another embodiment, the technician 601 may be deployed for a time extended till a problem is resolved. In other embodiments, if the problem is not resolved in the predetermined amount of time 605, the deployed technician 601 refers the problem to the centralized service 110 for resolution. In one embodiment, the technician 601 is deployed responsive to a customer contacting the centralized service 110 about the device. In another embodiment, the customer may contact the centralized service via a website, email or any other form of electronic communication. In other embodiments, the customer may contact persons associated with the centralized service via phone, postal mail or help-desk services. In still other embodiments, the deployed technician 601 is selected based on information on the device 101 provided by the customer. The centralized service 100 may select the appropriate or desired local technician to deploy onsite based on information received from the customer. Via this customer contact, a pre-evaluation of the issue may occur to determine the nature of the issues and the technician to deploy onsite. This may be done in cases when the customer cannot first connect to the device to the Internet and/or the centralized service.

In one embodiment, one or more issues and/or tasks to resolve the one or more issues are identified (step 720). In one embodiment, the one or more issues are identified by the local technician 601. In another embodiment, the one or more issues are identified by the centralized service 110. In still another embodiment, the local technician 601 and the centralized service 110 identifies one or more tasks to resolve the issue. In yet another embodiment, the local technician 601 may work in cooperation with the centralized system 110 to identify the one or more issues and/or one or more tasks. In a further embodiment, the local technician 601 and the centralized service 110 exchange information with each other in identifying the one or more issues and/or one or more tasks. In some embodiments, the tasks are identified based on a predetermined checklist or template. In one of these embodiments, the checklist or template is parsed for each issue to determine a list of tasks related to the issue. In another of these embodiments, the checklist or template is prepopulated with known issues and the corresponding tasks. In still another of these embodiments, the checklist or template is adaptively created and/or modified.

The local technician 601 performs (step 730) one or more tasks to resolve one or more of the identified issues 650. In one embodiment, the local technician 601 performs a part of one or more tasks. In another embodiment, the technician 601 performs the one or more tasks for a predetermined amount of time 605. In still another embodiment, the technician 601 completes all parts of one or more tasks if within skill level and/or time available to the technician. In one embodiment, the technician 601 works in communication with the centralized service 110 to perform the one or more tasks. In another embodiment, the technician 601 may collaborate, consult or coordinate with one or more other local technicians 601 and/or one or more remote technicians 115. In still another embodiment, performing the one or more tasks include installing an agent 307 or other software to connect the device 101 to the internet and/or the centralized service 110.

The centralized service 110 assigns (step 740) one or more tasks to resolve the issue 650 to one or more remote technicians 115. In one embodiment, the assignment is done responsive to receiving a communication from one of the device 101 or the local technician 601 such as a status 655 of the issue 650. In another embodiment, a task assignor 620 of the centralized service 110 manages the assigning of the one or more tasks to the one or more remote technicians. In yet another embodiment, the centralized service 110 reassigns to one or more technicians 115, one or more tasks previously assigned to one or more other remote technicians 115. In one embodiment, the assignment and/or reassignment of tasks is done on the basis of one or more of: skill type required or desired for the task, one or more attributes of the task, capabilities of the remote technicians, statuses of the tasks and/or issues and availabilities of the remote technicians. In another embodiment, the centralized service 110 assigns the one or more tasks to one or more queues 108. In still another embodiment, the queue manager 230 of the centralized service 110 manages assignments and reassignments to the queues 108.

In one embodiment, the assigning of step 740 includes deploying one or more local technicians 601 to provide onsite support at the point of service 105. In another embodiment, one or more additional local technicians 601 are deployed or assigned to provide onsite support based on communication received from the local technician 601 previously deployed. In still another embodiment, one or more local technicians 601 are deployed responsive to the centralized service receiving a request for providing technical support on a device 101 located at a point of service 105.

The centralized service 110 monitors (step 750) the issue and/or the status of one or more tasks for resolution of the issue 650. In one embodiment, the monitoring includes determining if the support provided by the one or more remote and/or local technicians satisfies a predetermined service level threshold 222. In another embodiment, the monitoring includes determining if a task assigned to a remote technician 115 is completed within a reasonable time. In still another embodiment, the centralized service 110 reassigns and/or escalates a task to a different remote or local technician responsive to determining that a task assigned to a technician is not serviced within a reasonable time and/or the service provided fails to satisfy the predetermined service level threshold 222. In yet another embodiment, the centralized service 110 may escalate a task to a high priority status on monitoring that a critical event has occurred. In a further embodiment, the monitoring may include communicating with the queue manager to determine availability of one or more remote and/or local technicians. In another embodiment, the monitoring includes determining if the issue is resolved within a predetermined amount of time.

Although the embodiments of the systems and methods of FIGS. 6 and 7 are generally described using remote and local onsite services for hybrid delivery or performing a service and tasks thereof, these systems and methods may be used for any combination of remote service personnel, local service personnel and automated systems. For example, the systems and methods of FIGS. 6 and 7 could be used to deliver services via a hybrid of remote service personnel and automated systems. In another example, the systems and methods of FIGS. 6 and 7 could be used to deliver services via a hybrid of local service personnel and automated systems. In another example, the systems and methods of FIGS. 6 and 7 could be used to deliver services via a hybrid of remote, service personnel, local service personnel and automated systems. With the systems and methods described herein, the centralized service can flexibly, intelligently, effectively and efficiently select the appropriate type of hybrid delivery model and manage, monitor and execute the same centrally on behalf of the requestor.

Figure 8A:
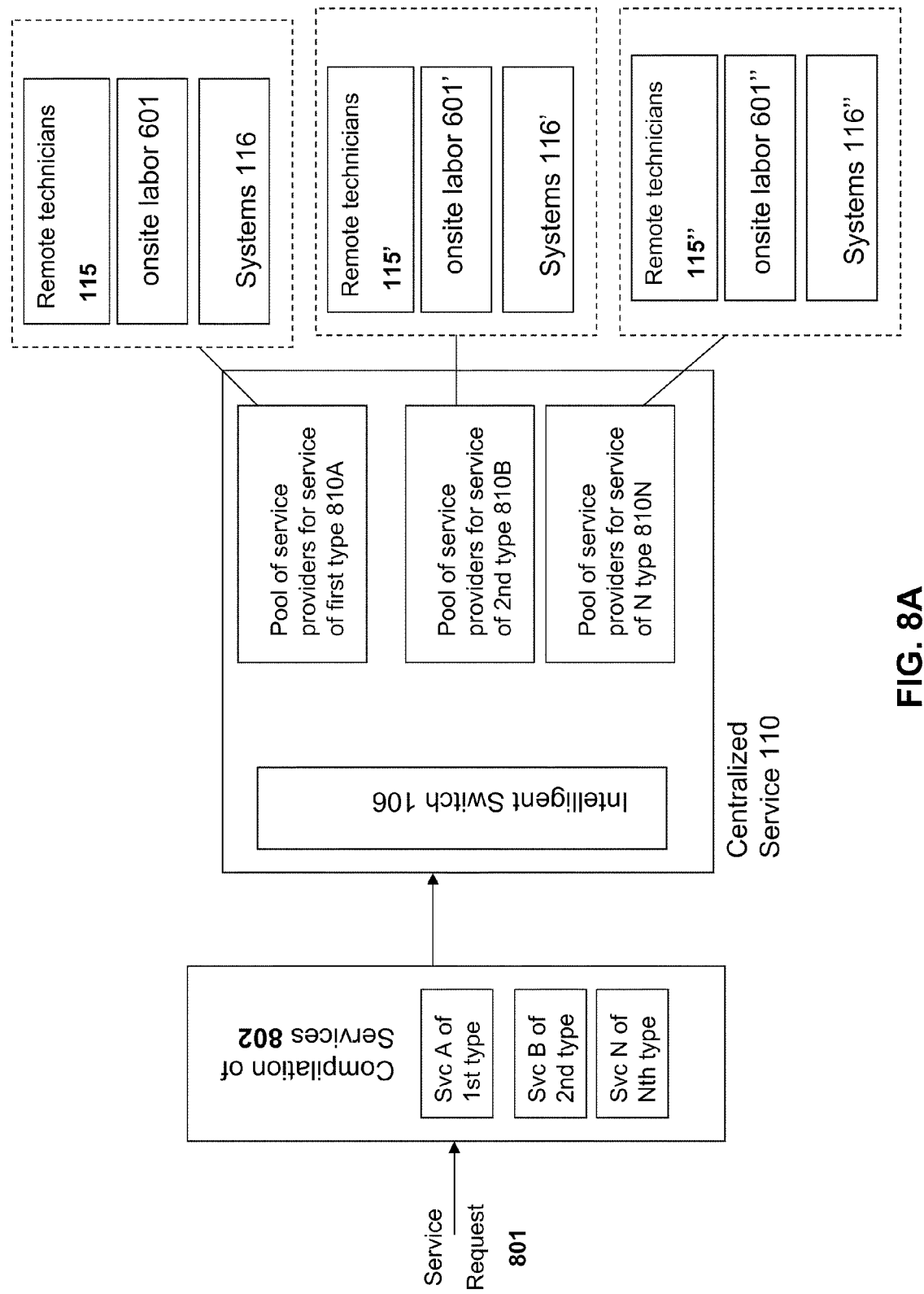
FIG. 8A is a block diagram that depicts an embodiment of an centralized service for performing a plurality of services from a request.
Figure 8B:
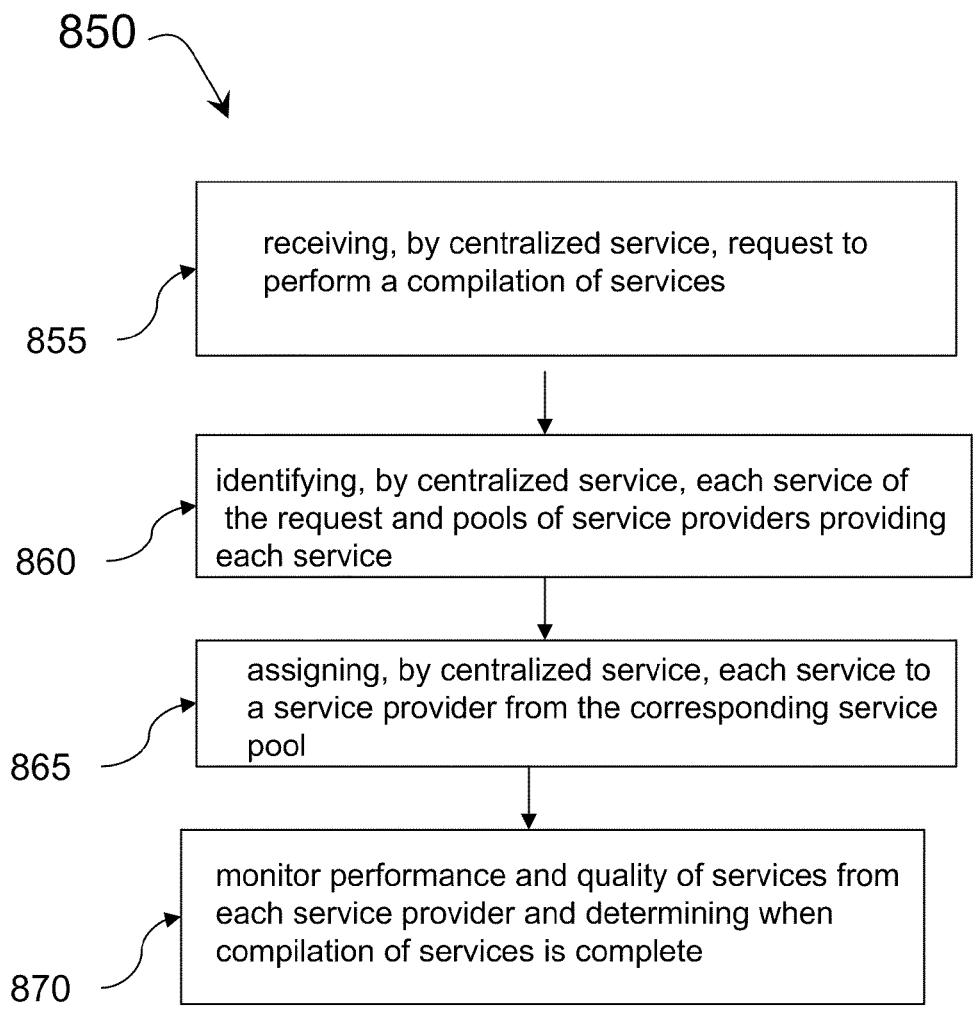
FIG. 8B is a flow diagram depicting steps of an embodiment of a method for performing a plurality of services from a request.
Figure 8C:
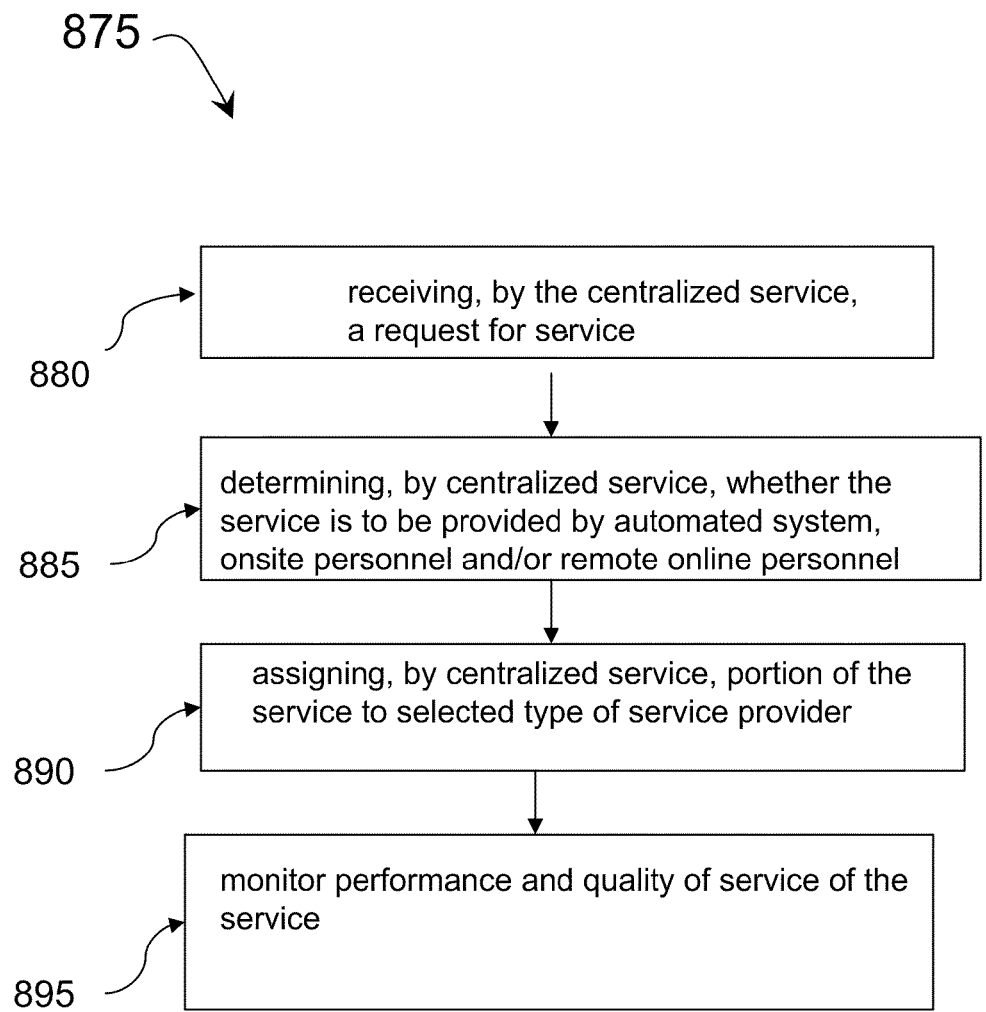

Referring now to FIGS. 8A-8C, embodiments of systems and methods for delivering a combination of services via the centralized service is depicted. The centralized service may provide a platform such as via a platform as a service (PaaS) model to allow a plurality of discrete service providers to deliver a combination of services in a combined model. The centralized service may combine and delivery to a requestor a plurality of discrete services that each may be performed by a different service pool and corresponding service providers.

For example, a bundle of services may be offered via the centralized a service. A first service may be remote technical support services offered by the centralize service itself. A second service may a home device purchase and installation service offered by an entity external to the centralized service. A third service may be a mobile device service offered by another entity external to the centralized service. For example, a compilation or bundle of services may be offered, such as remote technical support service from Plumchoice, Inc, home theater purchase and/or installation services from BestBuy, Inc. and mobile device service via AT&T or Verizon. A user may subscribe or request these bundle of services via the centralized service. The centralized service may select and assign for the Plumchoice, Inc. related service a remote technician from a pool of technicians. The centralized service may select and assign for the BestBuy service an onsite labor resource from a pool of onsite providers that can provide the BestBuy service. The centralized service may select and assign for the mobile device service an onsite labor resource and/or remote service from a pool of providers that can provide the mobile device service. For each of the services, the centralized service can manage service provider pools for that service.

Referring now to FIG. 8, an embodiment of an environment for managing the delivery of bundled services by the centralized service is depicted. The centralized service may manage the assignment of each service in the bundle of services to an appropriate service provider of a pool of service providers corresponding to the service. The centralized service 110 may receive a request 901 identifying or requesting a bundle of services 801. The bundle of services may comprise services A-N each with a corresponding service type 1-N. Each of the services may be associated with different entities. The centralized service may manage pools of services providers corresponding to different services by service type. For example, the centralized service may manage a pool of services providers 810A for service A of the $1^{st}$ type, a pool of service providers 810B for service B of a $2^{nd}$ type, and a pool of service providers 810N for service N of an Nth type. Each of the pool of service providers may include a remote technician type of service provider, an onsite labor type of service provider or a system 116, or any hybrid or combination of these service provider types.

In further detail, the request 801 may comprise a request for any combination of services 801. In some embodiments, the request is a plurality of requests, each for a different service. In some embodiments, the request identifies a predetermined bundle of services 802, such as via a bundle identifier or name. In some embodiments, the request is a confirmation of a subscription to the compilation of services 802. In some embodiments, the request is a selection from a user interface, such as via a web-site, of the compilation of services. In some embodiments, the request is communicated from an agent of a device. In some embodiments, the delivery component of the agent transmit the request. In some embodiments, the sales component of the agent transmits the request. In some embodiments, the request is generated from an acknowledgement or confirmation from a user to the offer of the compilation of services via the agent. In some embodiments, a user submits the request for the compilation of services via a single user interface element selection via a mobile or wireless device. In some embodiments, the request comes from a user via a communications interface provided by the agent.

The compilation of services 802 may comprise any combination of any type and form of services. The services may be discrete and/or heterogeneous with respect to each other. In some embodiments, the services in the bundle 802 are discrete and/or heterogeneous relative to the entity offering for sale each services (e.g., Company A offers service A and Company B offers Service B). In some embodiments, the services in the bundle 802 are discrete and/or heterogeneous relative to the entity brand for each service. In some embodiments, the services in the bundle 802 are discrete and/or heterogeneous relative to source each of the services. In some embodiments, the services in the bundle 802 are discrete and/or heterogeneous relative to the type of sales channel each of the services are offered and/or sold. In some embodiments, the services in the bundle 802 are discrete and/or heterogeneous relative to where the customer or user purchases each of services.

In some embodiments, the services in the bundle 802 are discrete and/or heterogeneous relative to the type of device each service is being delivered. In some embodiments, the services in the bundle 802 are discrete and/or heterogeneous relative to the type of software each service is provisioning. In some embodiments, the services in the bundle 802 are discrete and/or heterogeneous relative to the type of skills each service requires. In some embodiments, the services in the bundle 802 are discrete and/or heterogeneous relative to the location each service is being delivered to. In some embodiments, the services in the bundle 802 are discrete and/or heterogeneous relative to the service providers capable of provides the service. In some embodiments, the services in the bundle 802 are discrete and/or heterogeneous relative to the type of service providers providing the service. In some embodiments, the services in the bundle 802 are discrete and/or heterogeneous relative to the whether the service provider is remote service personnel, onsite service personnel or an automated system.

In some embodiments, the centralized service provides or identifies the compilation of services 802, such as via service compiler. In some embodiments, a user is able to create or identify a compilation of service. For example, the user may select from a plurality of services via a web-site or other application to form a compilation of services 802. In some embodiments, an entity, such as a retailer or wholesaler, may create or identify a compilation of services. The compilation of services may be a predetermined set or bundle of discrete services. In some embodiments, the compilation of services may be dynamically generated or identified on demand.

The type for a service may be identified by a name, code or identifier. In some embodiments, the type is identified by the centralized service by the name, core of identifier of the service. The service identifier may encode the type. The service name and/or type identifiers may be created, encoded, managed and organized in any manner.

The centralized service may identify the service and/or service type from the request. In some embodiments, prior to performing any of the services in the bundle and/or assigning the service to a queue of a service provider, the centralized service may determine the work type for each service from the request as described above in connection with FIG. 4. In some embodiments, the centralized service performs any of the operations described with work request 201 in FIG. 4 for each of the services in the bundle of service 802. The centralized service may perform the operations of each service in the bundle as or like discrete work requests 201 and working with any combination of the different and/or the same service level attributes, sets of queues, 109, capabilities 210 and capabilities databases 215 for each service and corresponding service providers.

Each service may be performed or delivered by a different pool of service providers 810. The pool of service providers may be organized in any manner logical or desired or predetermined in accordance with type of service. In some embodiments, each type of service as corresponding one or more pools of service providers. In some embodiments, a plurality of different services may share a pool of services providers. In some embodiments, a plurality of different services may share one or more service providers. In some embodiments, one or more of the same service providers may be in different pool of services providers for different services. In some embodiments, a pool of service providers may include service providers of the remote online type. In some embodiments, a pool of service providers may include service providers of the system type. In some embodiments, a pool of service providers may include service providers of the online or local labor type. In some embodiments, a pool of service providers may include any combination of remote online, system, and/or onsite types. In some embodiments, any one or more pools of service providers is managed by an embodiment of a second centralized service.

Each service provider and/or pools of service providers may be under control and/or management of the same or different entity. In some embodiments, service provider and/or pools of services providers may be under the control and management of one entity. In some embodiments, service provider and/or pools of service providers may be under the control and management of an entity different that of any one or more other service providers and/or pools of service provider. Each service provide and/or pools of service providers may be located in the same or different geographic locations.

Referring now to FIG. 8B, embodiments of steps of a method 850 are depicted. In brief overview, at step 855, the centralized service receives a request to perform a compilation of services. At step 860, the centralized service identifies each service of the bundle of services requests. the type of service and any service pools corresponding to that type of service. At step 865, the centralize service assigned for each service a service provider from the corresponding service pool. At step 870, the centralized service monitor the performance and quality of the compilation of services.

In further detail of step 855, the centralized service may receive any type and form of request for a compilation of services. The request may be received via a web site. The request may be received via an agent. The request may be received via a wireless device of the requestor. The request may be received via a communications interface. The centralized service may receive a plurality of requests and identify the request from the same user and aggregate the requests. A request may be received via an interface to a system of another entity, such as a sales or ordering system. The request may identify a predetermined bundle of services. The request may identify each of a plurality of services.

At step 860, the centralized service may identify each of the services making up the bundle or compilation of services. The centralized service may identify each of the services based on a name of the compilation or bundle and querying a database identifying each of the services in the bundles. The centralized service may identify each of the services from an encoding of the bundle name or identifier. The centralized service may identify each of the services from content of the request.

For each service, the centralized service identifies or determines the service type. The centralized service may identify the service type from the service identifier. The centralized service may identify the service type from the bundle identifier. The centralized service may identify the service type from the request. The centralized service may identify the service type from a database comprising index of services, service types and/or compilation of services.

Based on the service and/or service type, the centralized service identifies or selects a pool of service providers for that service. In some embodiments, the centralized service identifies or selects one pool of services providers for that service or service type. In some embodiments, the centralized service identifies or selects one pool of service providers for that service or service type from a plurality of pools that correspond to that service or service type. The centralized service may break down each service into a plurality of work requests. For each of the plurality of work requests, the centralized service may identify a pool of service providers.

At step 865, for each service in the bundle, the centralized service assigns a service provider from the corresponding selected pool of services providers to perform the service or portion thereof. In view of FIG. 4, the centralized service may for each service determine or identify one or more work types and one or more service level attributes corresponding to each work type. Based on matching service level attributes of the work type to the capabilities database of service providers, the centralized service selects a service provider from the pool and assigns the work or service request to the queue of the selected service provider. The centralized service may break down each service into a plurality of work requests. For each of the plurality of work requests, the centralized service may select a service provider from a pool based on matching service level attributes of the work type to the capabilities database of service providers.

At step 870, the centralized service may monitor performance and/or quality of service of the compilation of services. The centralized service may monitor the performance of each of the services in the compilation of services to determine the status of the compilation of services. The centralized service may monitor the performance of each of the services in the compilation of services to determine whether the compilation of services has been completed. The centralized service may monitor the performance of each of the services in the compilation of services to determine the amount of time, estimated or otherwise, to complete the compilation of services. The centralized service may monitor the performance of each of the services in the compilation of services to determine when the compilation of services has been completed or when the compilation of services may be completed. Based on the performance status of each of the services, the centralized service may manage and report the performance status of the compilation of services.

Using any of systems and methods of FIGS. 6 and 7, in some embodiments, the centralized service may treat or consider each service as a task to manage the status of the service. For example, the centralized service may manage the compilation as an issue 650 identified in FIG. 6 with the plurality of services as tasks A-N to determine the status of the issue 655. Using any of systems and methods of FIGS. 6 and 7, in some embodiments, the centralized service may manage each service as a task and each service having sub-tasks to manage the status of the service. For example, the centralized service may manage a service from the compilation as an issue 650 identified in FIG. 6 with a plurality of tasks A-N to determine the status of the issue 655. In some embodiments in view of FIGS. 6 and 7, the centralized service may both manage the compilation of services as an issue 650 with services as tasks, and each service as an issue with tasks of the services as tasks. Any of the embodiments of FIGS. 4, 6 and 7 may be used in assigning, tracking and managing services of a compilation of services.

The centralized service may monitor the quality of service of each of the services in the compilation of services to determine the quality of service of the compilation of services. The centralized service may monitor the quality of service of each service in the compilation of services against a predetermined service threshold for that service. The centralized service may monitor an aggregation of the quality of services of each service against a predetermined service threshold for the compilation of services. The predetermined service threshold for the compilation may be any summation, aggregation or combination, weighed or otherwise, of each of the service thresholds of the services making up the compilation. Based on the monitoring of performance and/or quality of service of the compilation of services, the centralized service may identify and store any related measurements to the capabilities database for the service providers.

Referring now to FIG. 8C, embodiments of a method 875 for determining what type of service provider to perform a service is depicted. In brief overview, at step 880, the centralized service receives a request for service At step 885, the centralized service determines what type of service provider is to be used or assigned to perform the service. At step 890, the centralized service assigns the service or portion thereof to a service provider of the selected type. At step 895, the centralized service monitors the performance and quality of the service by the service provider.

In further details of step 880, the centralized service may receive a request for one service or a plurality of services. In some embodiments, the centralized service receives a request for a compilation of services. In some embodiments, the request identifies the service type. In some embodiments, the request identifies the type of service provider.

At step 885, the centralized service determines the type of service provider to service the requested service. Service providers may be identified as any of the following types: remote online service provider, onsite or local service provider, or a system based service provider (e.g., automated system). In some embodiments, the centralized service determines the type of service provider from the type of service. In some embodiments, the centralized service determines the type of service provider from the request, such as via content of the request.

In some embodiments, the centralized service via a database matches the type of service to the type of service provider for the service. In some embodiments, the centralized service via a database matches the service to the type of service provider for the service. In some embodiments, the centralized service via a database matches the service and type of service to the type of service provider for the service. In some embodiments, the centralized service via a database matches any requestor information, such as location, service environment and/or device environment, to the type of service provider for the service.

In some embodiments, the centralized service identifies via performance and/or quality of service data stored in capabilities database any statistics of performance or quality by type of service provider. In cases where multiple types of service providers may be used for the same type of service, the centralized service may select one service type over another based on statistics regarding performance and/or quality of service.

At step 890, the centralized service selects a service provider corresponding to the selected service provider type. In some embodiments, the centralized service selects a service provider from a pool of service providers corresponding to the service provider type. In some embodiments, the centralized service selects a service provider of the service provider type from a pool of service providers corresponding to the service and the pool of service providers comprising different service provider types.

The centralized service may select the service provider corresponding to the service provider type and using any of the techniques described in conjunction with FIGS. 4, 6 and 7. In some embodiments, the centralized service provider may select a plurality of service providers of the selected service provider type to perform the service. In some embodiments, one selected service provider performs one portion of the service, such as a first task, and a second selected service providers performs another portion of the service, such as a second task.

At step 895, the centralized service monitors the performance and/or quality of service of the requested service. The centralized service may the performance and/or quality of service of the selected service provider(s) of the selected service provider type. The centralized service may store any performance and/or quality of service metrics on the service and/or service provider and/or service provider type to a capabilities database.

Figure 9A:
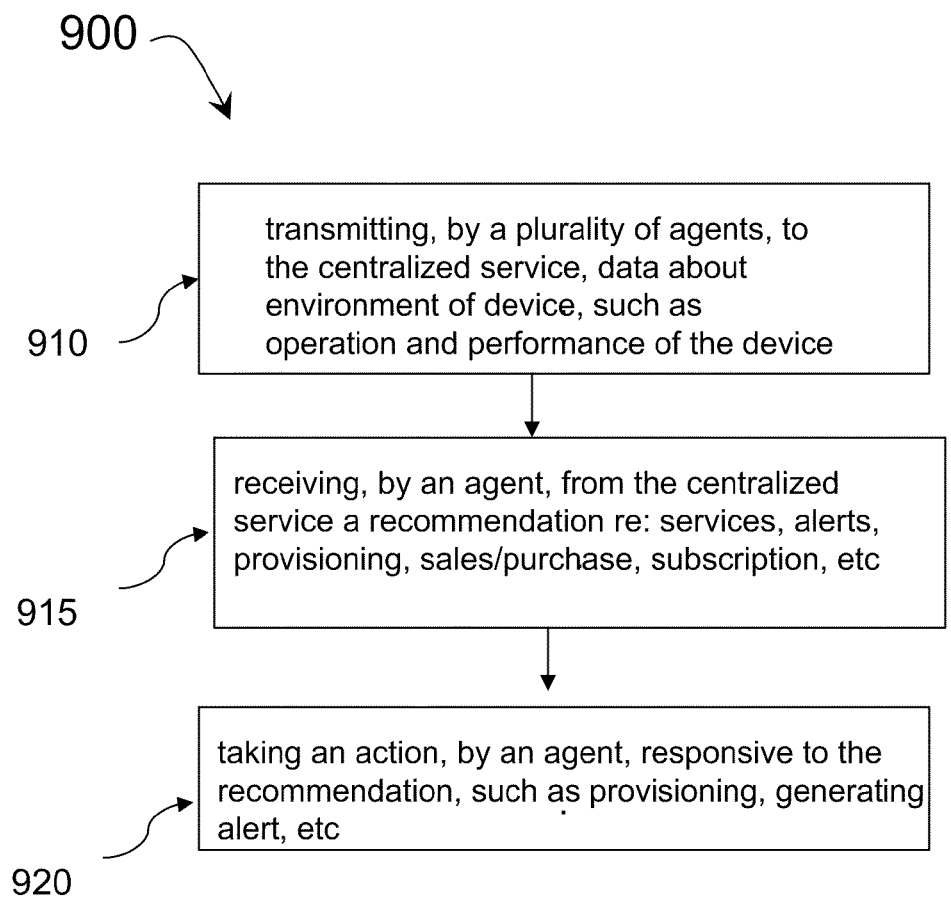
FIG. 9A is a flow diagram depicting steps of an embodiment of a method of an agent to provide services to a device from the centralized service.

Referring now to FIG. 9A, embodiments of steps of a method 900 for an agent of a device to deliver services in connection with the centralized service is depicted. In brief overview, at step 910, a plurality of agents of a plurality of device transmit data about the environment of the device to the centralized service. At step 915, any one or more agents may receive a recommendation from the centralized service. At step 920, responsive to the centralized service, the agent make take any one or more of a plurality actions related to the functionality of the agent.

In further details, at step 910, each of the plurality of agents may transmit data about the environment of the device to the centralized service. The agents may stream the data as discovered. The agents may collect the data and send one or more batches of data to the centralized service. The agents may store the data locally, permanently or temporarily, and send a copy of the data to the centralized service. The agents may store the data to a remote network accessible storage of the centralized service. In some embodiments, the agents may transmit data to a local collection point, such as an aggregator agent, such as the embodiments depicted in FIG. 5, Each agent may be deployed on heterogeneous devices in type and/or environments. In some embodiments, each agent may execute on a device that is different than a device of another agent. Some agents may be deployed on the same type of device as other agents. Each agent may be deployed on a device with the same or different operating system. Each agent may be deployed on a device with different configuration of software, including the operating system, drivers, applications. etc. Each agent may be deployed on a device with different configuration of hardware components of the device, such as memory size, storage size, display types, etc. Each agent may be deployed on a device with different types of hardware components, such as different processor, memory types and chips, storage types, display types, etc. Each agent may be deployed on a device with different types of network interfaces. Each agent may be deployed in a network environment (devices, network fabric, servers, ISPs) than network environments of other agents and devices.

Via the discovery and/or data collection components/functionality of the agent, each agent may transmit data about the number, type and configuration of each software and hardware component of the device. Each agent may transmit data about the operation of the device. Each agent may transmit data about the operation of software on the device. Each agent may transmit data about the operation of hardware components on the device. Each agent may transmit data about the usage of resources on the device. Each agent may transmit data about performance of software and/or hardware on the device. Each agent may transmit data about the performance and operation of a combination of a software and a hardware component of the device. Each agent may transmit data about the performance and operation of a combination of a plurality of software components and a hardware component of the device. Each agent may transmit data about the performance and operation of a combination of the configuration of software components and configuration of a hardware component of the device. Each agent may transmit data about the performance and operation of a combination of the configuration of a plurality of software components and configuration of a plurality of hardware components of the device. Each agent may transmit data about any operational and/or performance issues with any software component, hardware component or combination of software and hardware components. Each agent may transmit one or more events that occur in the environment of the device and detected by the agent. Each agent may transmit a sequence of events that occur in the environment of the device and detected by the agent.

The agent may transmit this data upon any changes to the environment, such as installation, de-installation, configuration changes, performance or operational changes, issues, etc. The agent may transmit this data upon startup of the agent. The agent may transmit this data upon startup of the device. The agent may transmit this data upon request by a user. The agent may transmit this data upon request by the centralized service. The agent may transmit this data upon a predetermined schedule. The agent may transmit this data according to any policies of the user, agent, centralized service or otherwise.

At step 915, an agent may receive a communication from the centralized service providing one or more recommendations or calls for action based on the environment of the device. A component of the agent may receive a recommendation. A plurality of components of the agent may each receive a recommendation. An agent may receive a plurality of communications from the centralized service providing one or more recommendations or calls for action based on the environment of the device. The agent may receive such a communication responsive to a transmission about data of the environment of the device. The agent may receive such a communication responsive to a transmission about a change or event in the environment of the device. The agent may receive such a communication upon startup or execution of the agent. The agent may receive such a communication upon startup of the device. The agent may receive such a communication according to a policy of the device, agent, user or centralized service. The agent may receive such a communication on a predetermined schedule.

As described herein, the centralized service may compare and analyze the environment data of the device to environment data in a cross-device database. The centralized service may correlate the data of the device to a cross-device database identifying performance and operational events, metrics and results from a plurality of agents across a plurality of heterogeneous devices and environments. The centralized service may correlate one or more events of the device to a sequence of events in the cross-device database. The centralized service may correlate data from one device to data from another data. The centralized service may correlate the performance and/or operation of a combination of one software component and one hardware component of one device to the performance and/or operation of a combination of one software component and one hardware component of another device At step 920, the agent may take an action responsive to the centralized service's recommendation. The agent may take an action identified by the recommendation. The agent may take an action instructed by the recommendation. The recommendation may provide commands or directives for the agent. The recommendation may provide a script, program or executable instructions for the agent to execute. A component of the agent may receive an instruction or command from the recommendation. The agent may configure or instruct a component of the agent responsive to the recommendation.

The recommendation may trigger or execute any functionality of any component of the agent. For example, the recommendation may be for the data collection component to collect additional data. The recommendation may be for the data collection component o collection a predetermined set of data. The recommendation may be for the delivery component to deliver one or more services from the centralized service. The recommendation may be for the provisioning component to provision a recommended or predetermined resource to the device. The recommendation may be for the sales component to offer and provide for sale any recommended products and/or services, such as services of the centralized service. The recommendation may be for the discovery component to discover configuration of software and hardware of the device, such as a selected software component or hardware component. The recommendation may be for the discovery component to perform diagnosis on the environment of the device, such as any particular software or hardware component. The recommendation may be for the reporting component to provide a report on operation or performance of the device, such as a particular report on operation or performance of the device or a particular software or hardware component of the device. The recommendation may be for the alerting component to generate or provide an alert having recommended or specified information, call for action or other suggestion or recommendation.

In some embodiments, an agent receives a recommendation of a provisioning action on or for the device. Responsive to this recommendation, the agent may generate an alert on the device to request a user to execute the provisioning action. In some embodiments, the agent may receive a confirmation or acknowledgement from the user to execute the provisioning action. In some embodiments, the agent may receive a request from the user to not execute the provisioning action. In some embodiments, the agent may receive a request from the user to have the agent execute the provisioning action. In some embodiments, the agent may receive a request from the user to have the centralized service execute the provisioning action. In some embodiments, the agent may perform the provisioning action on behalf of the user or the device. In some embodiments, the agent may perform the provisioning action on behalf of the user or the device and automatically upon receipt of the recommendation. In some embodiments, the agent may track, monitor and report on the status of performance of the provisioning action to the user and/or centralized service.

By way of example but not in any manner limiting, the provisioning action may include any one or more of the following: installation of recommended software, installation of recommended hardware, configuration action on installed software, configuration action on installed hardware of the device, execution of an optimization tool, execution of software, purchase of one or more remote services of the centralized service, provisioning of one or more remote services of the centralized service, de-installation of software, de-installation of hardware, a change to configuration of operating system, and a change to state of the operating system.

In some embodiments, an agent receives a recommendation of a remote service from the centralized service. The agent may receive a recommendation for a compilation of services generated from the service compiler of the centralized service. The agent may receive identification of a subscription of one or more remote services provided by the centralized service. The agent may provision the remote service upon confirmation from the user, such as via a generated alert. The agent may provision the remote service automatically upon receipt. The agent may provision the remote service responsive to a policy of the device, user, agent or centralized service.

Figure 9B:
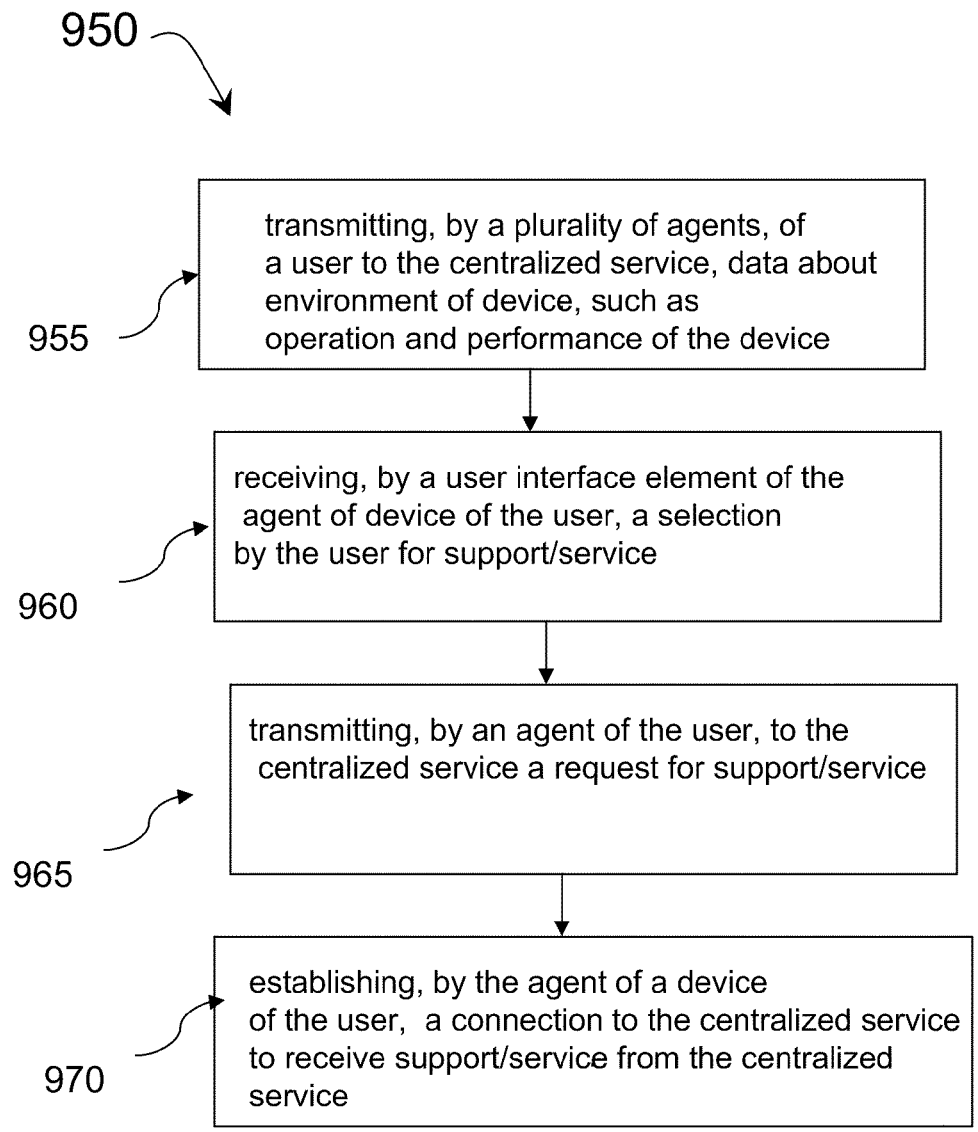
FIG. 9B is a flow diagram depicting steps of another embodiment of a method an agent to provide services to a device from the centralized service.

Referring now to FIG. 9B, embodiments of steps of a method 950 for providing a support to a plurality of devices of a user environment, including wireless devices, is depicted. In brief overview, at step 955, a plurality of agents on corresponding devices of a user transmit data about the environment of the devices. At step 960, a user on one of the wireless or mobile devices selects a single user interface element to request support or service from the centralized service. At step 965, the agent transmits a request for support or service to the centralized service. At step 970, the agent establishes a connection with the centralized service to receive the requested support or service.

In further details, at step 955, a user may have a plurality of devices. The devices may be heterogeneous and may be any combination of devices, from desktop computers, laptop computers, mobile phones, smart devices, televisions, home theater devices, etc. The devices may be in communication via one or more networks and/or operate in an environment of the user, generally referred to as the user's environment. The environment may include any type and form of fabric for operating the devices, including connectivity, networks, ISPs, power, operating conditions, locations, etc. In some embodiments, the user may be an enterprise and the enterprise environment may include any one or more data centers and any elements making up the information and computer network fabric and technology of the enterprise. These devices and the user's environment may be supported and/or serviced via the centralized service. Agents may be deployed on each of the supported devices. In some embodiments, some devices may be supported but not have an agent executing on that device.

Each of the agents in the user's environment or on the user's devices may transmit data about the user's environment, the environment of the data and the operation and performance of the user's environment, the device and any software and hardware of the device or operating in the user's environment. The agents may communicate any events or sequence of events that occur on the device or in the user's environment. Each of the agents may communicate such information to other agents in the user's environment. In some embodiments, a master agent or aggregator agent collects and aggregates such information from the other agents and provides a centralized collection point and interface to the centralized service. The centralized service may track and manage the number of devices and the environment of the devices in the user's environment.

The centralized service may correlate the data and events from each agent and device. The centralized service may correlate the data and events across the agents to provide a cross-device knowledge base for the environment of the user and performance and operation of combinations of software and hardware components in the user's environment. The centralized service may correlate the data and events across the agents with data and events from other agents outside the user's environments. The centralized service may correlate the data and events across the agents with data and events from agents in one or more other user environments. The centralized service may correlate the data and events across the agents with data and events of a plurality of user environments.

At step 960, a user may select a user interface element on a device for support and service. In some embodiments, the agent provide a user interface element selectable by the user to request or launch service from the centralized service. For example, the agent may provide an icon or shortcut on the desktop of a computer or deck of a mobile that the user can select via a single or double mouse click to launch service from the centralized service. In some embodiments, the selectable user interface element may be a menu item of a user interface of the agent. In some embodiments, the selectable user interface element may be an app(lication) on the desktop or deck of a mobile device. For example, the selectable user interface element may be an icon of the agent application on the mobile device. In some embodiments, the selectable user interface may be a user interface element of an alert or reported generated by the agent. In some embodiments, the selectable user interface element may be a URL or hyperlink in an alert. In some embodiments, the selectable user interface element may be a URL or hyperlink in any form of communications between the communications interface of the agent and the centralized service.

With the easily selectable user interface element to launch service from the centralized service, a user can obtain service from the centralized service from any device in the user's environments for that device or any other device in the user's environment. For example, a user via any wireless device, such cellphone, smartphone or PDA may one click an icon on the deck of such a device to request service from the centralized service for any device in the user's environment.

At step 965, the agent may detect the selection of the user interface element or the user's request for service from the centralized service, and automatically transmit a request for service to the centralized service on behalf of the user. The agent may transmit with the request any data or events of the environment of the requesting device. The agent may transmit with the request any data or events of the user's environment. The agent may transmit information about the request to the other agent's in the user's environment. In this manner, the other agents may be in a state or aware that the centralized service may establish connections via these other agents, to provide support and service to the user's environment.

At step 970, the agent establishes a connection with the centralized service. The agent may establish a connection from the wireless or mobile device of the user to the centralized service. The agent may establish the connection automatically responsive to the request sent to the centralized service. The agent may establish the connection automatically responsive to the centralized service's response to the request. The agent may establish the connection responsive to a remote service personnel of the centralized service's requesting to establish a connection with the device. The agent may establish the connection with the centralized service upon confirmation from the user that such a connection should be established. Over this connection, the centralized service and agent may establish any type and form of sessions or communications, such as a remote screen sharing session.

The agent may establish via communications interface a form of communications, such as email, instant messaging, etc., with the centralized service. The agent may learn more from the user about the support or service being requested for the user's environment. Responsive to this information, the centralized service may establish connections and sessions with other agents in the user's environment to provide support and service to the user's environment.

In some embodiments, responsive to the user's selection of the user interface element, the agent(s) of the user's environment in coordination with the centralized service may deliver or provide any one or more services to the user's environment, either automatically or responsive to the user's request.

Figure 10:
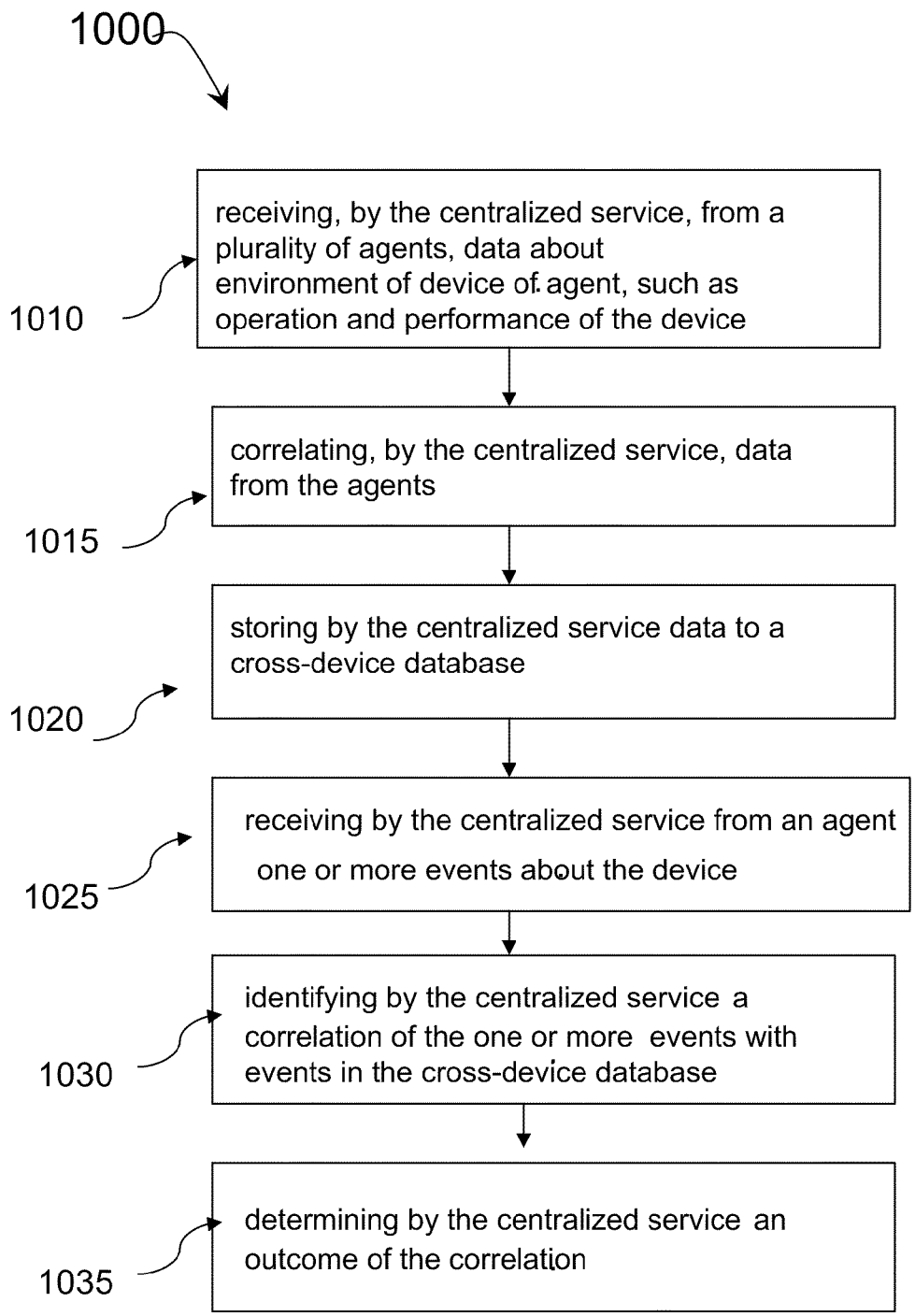
FIG. 10 is a flow diagram depicting steps of an embodiment of a method of providing and using a cross-device database by the centralized service.

Referring now to FIG. 10, embodiments of steps of a method 1000 for creating and using a cross-device database is depicted. In brief overview, at step 1010, the centralized service receives from a plurality of agents, data about the environment of the device of the agent. At step 1015, the centralized service correlates the received data and at step 1020, stores the data and correlation in a cross-device database. At step 1025, the centralized services receives one or more events about a device from an agent. At step 1030, the centralized service perform analysis of the events to the cross-device database to identify one or more correlations. At step 1035, the centralized service determines an outcome of the correlation, which may result in the centralized service communicating one or more recommendations to an agent or subscriber to such information.

At step 1010, the centralized service may receive data about a plurality of different environments, different devices and different combinations of software and hardware across a plurality of user environments. The data may identify compatibility between a combination of software and hardware. The data may identify issues between a combination of software and hardware. The data may identify performance or operation data of a combination of software and hardware on a device. The data may identify performance or operation data of a combination of software and hardware on a plurality of devices. The data may identify performance or operation data performance of a combination of software and hardware in an environment. The data may identify performance or operation data a combination of software and hardware in a plurality of environments. The data may identify performance or operation data of a combination of software and hardware in a user environment or across a plurality of user environments.

The data may identify operational effectiveness of a user environment. The data may identify operational effectiveness of a device. The data may identify operational effectiveness of a combination of software and hardware. The data may identify inter-operational compatibility of elements of a user environment. The data may identify inter-operational compatibility between devices. The data may identify operational compatibility between software and hardware. The data may identify operational compatibility between a combination of a particular software with a particular hardware or environment.

The data may identify one or more events. The one or more events may identify a sequence of events. The data may identify one or more events corresponding to performance or operation of a device. The data may identify one or more events corresponding to performance or operation of a software on the device. The data may identify one or more events corresponding to performance or operation of a hardware of the device. The data may identify one or more events corresponding to performance or operation of a combination of a software component and hardware component of the device. The data may identify one or more events corresponding to performance or operation of a plurality of devices. The data may identify one or more events corresponding to performance or operation of a user environment. The data may identify one or more events corresponding to inter-operational compatibility between devices. The data may identify one or more events corresponding to inter-operational compatibility between elements in an environment. The data may identify one or more events corresponding to inter-operational compatibility between devices.

At step 1015, the centralized service correlates the data and/or events from the data. In some embodiments, the centralized service correlates a first event of a device with a second event from the device. In some embodiments, the centralized service correlates a first sequence of events of the device with a second sequence of events of the device. In some embodiments, the centralized service correlates a first event of the device with a second event of a second device. In some embodiments, the centralized service correlates a first sequence of events of a first device with a second sequence of events with a second device. In some embodiments, the centralized service correlates an event of the device with an event or sequence of events of the user environment.

In some embodiments, the centralized service correlates an event of a device with one or more events stored in the cross-device database. In some embodiments, the centralized service correlates an event from the device with a sequence of events in the cross-device database. In some embodiments, the centralized service correlates a sequence of events of the device with a sequence of events stored in the cross-device database. In some embodiments, the centralized service correlates an event of the device with an event or sequence of events of another user environment in the cross-device database.

At step 1020, the centralized service stores the data from the agents and/or correlation of the data to one or more databases representing a repository of cross-device knowledge. The one or more databases may be organized and deployed in any manner and across one or more devices. The databases may be organized by user, user environment, device types, software and/or hardware component categories. In some embodiments, there may be a single distributed database for all data across all devices and users accessing the centralized service.

In some embodiments, the centralized service stores the data as received from the agents to one or more databases. In some embodiments, the centralized service stores any correlations to the one or more databases. In some embodiments, the centralized service stores the received data and any determined correlations to the one or more databases. In some embodiments, the centralized service stores the determined correlations in association with the received data to the one or more databases. In some embodiments, the centralized service stores events and corresponding correlations to the one or more databases. In some embodiments, the centralized service stores a sequence of events and corresponding correlations to the one or more databases. In some embodiments, the centralized service stores one or more events in association with another one or more events to the one or more databases. In some embodiments, the centralized service stores one or more events in association with another one or more events and corresponding correlations to the one or more databases. In some embodiments, the centralized service stores a first sequence of events in association with a second sequence of events to the one or more databases. In some embodiments, the centralized service stores a first sequence of events in association with a second sequence of events and corresponding correlations to the one or more databases.

The database design and storage may be designed to allow or facilitate the querying of any one or more stored elements to one or more elements. The database design and storage may be designed to allow or facilitate the querying of events to correlations. The database design and storage may be designed to allow or facilitate the querying of devices to events to correlations. The database design and storage may be designed to allow or facilitate the querying of users to events to correlations. The database design and storage may be designed to allow or facilitate the querying of data to events. The database design and storage may be designed to allow or facilitate the querying of events to events. The database design and storage may be designed to allow or facilitate the querying of devices to devices. The database design and storage may be designed to allow or facilitate the querying of combinations of software and hardware and any corresponding performance or operational, operational effectiveness or compatibility data.

At step 1025, the centralized service receive data from a device. The centralized service may receive data about an event or sequence of events. The centralized service may receive data about an event in the environment of the device. The centralized service may receive data about an event on the device. The centralized service may receive data about a change in the operation or performance of the device. The centralized service may receive data about a change in the software of the device. The centralized service may receive data about a change in the hardware of the device. The centralized service may receive data about a change to a combination of software and hardware on the device. The centralized service may receive data about a change in the user environment. The centralized service may receive data about a change in the environment of the device. The centralized service may receive data about an incompatibility with the software and/or hardware of the device. The centralized service may receive data about an incompatibility with user environment and the device.

In some embodiments, the centralized service receives a request from the agent to check the data of the device against the cross-device database. In some embodiments, the centralized service receives a request from the user to check the data of the device against the cross-device database.

At step 1030, the centralized service analyzes the data from the agent against data in the cross-device database. The centralized service may correlate the event or events received from the agent with events or events stored in the cross-device database for the same device, from other devices or from other environments. In some embodiments, the centralized service correlates a reported event for the agent by matching or corresponding to the event to other events stored in the cross-device database. In some embodiments, the centralized service correlates a sequence of events of the device to one or more events stored in the cross-device database. In some embodiments, the centralized service correlates a sequence of events of the device to a sequence of events stored in the cross-device database. In some embodiments, the centralized service correlates a sequence of events to one or more events stored in the cross-device database.

At step 1035, the centralized service, based on the analysis, comparison and correlation, determines an outcome of the correlation. The outcome may be a determination of a state or status of the device. The outcome may be a determination of a state or status of operation of the device. The outcome may be a determination of a state or status of performance of the device. The outcome may be a determination of a state or status of software of the device. The outcome may be a determination of a state or status of hardware of the device. The outcome may be a determination of a state or status of compatibility of a combination of software and hardware. The outcome may be a determination of a state or status of incompatibility of a combination of software and hardware. The outcome may be a determination of a state or status of compatibility/incompatibility of the device or an elements thereof with a user environment.

The outcome may be a prediction of one or more events to occur on the device. The outcome may be a prediction of a sequence of events to occur on the device. The outcome may be a prediction of an issue with device. The outcome may be a prediction of a performance degradation of the device. The outcome may be a prediction of an operational failure or error with the device.

The outcome may be any recommendation by the centralized service, such as a recommendation for a provisioning action or service. For example, an outcome may a recommendation as described in any embodiments of FIG. 9A. The centralized service may communicate the outcome to the agent. In some embodiments, the centralized service may communicate the outcome to a user of the device. In some embodiments, the centralized service may communicate the outcome to any users who subscribe to the centralized service or information from the centralized service. In some embodiments, the centralized service may communicate the outcome to a user of the device. In some embodiments, the centralized service may communicate the outcome to a support personnel of the centralized service. In some embodiments, the centralized service may communicate a recommendation to the agent.

In view of the structure, functions and apparatus of the systems and methods described herein, the present solution provides a dynamic, efficient and intelligent system for providing a multi-device, multi-service platform via a client agent. Having described certain embodiments of methods and systems for providing the multi-device, multi-service platform via a client agent, it will now become apparent to one of skill in the art that other embodiments incorporating the concepts of the invention may be used. Therefore, the invention should not be limited to certain embodiments.

What is claimed:

1. A method for providing recommendation of a provisioning action for a device, the method comprising:
   (a) transmitting, by a first agent executing on a first device to a centralized service executing on a server, data about an environment of the first device of a first user;
   (b) transmitting, by a second agent executing on a second device to the centralized service, data about an environment of the second device of a second user;
   (c) receiving, by the first agent, from the centralized service a recommendation, generated by the centralized service, of a provisioning action for the first device, the recommendation generated from the centralized service based on correlating data between at least the environment of the first device of the first user and the environment of the second device of the second user; and
   (d) generating, by the first agent, an alert on the first device to request a user of the first device to execute the provisioning action.

2. The method of claim 1, further comprising, establishing by the first agent a communications interface between the user of the first device and the centralized service.

3. The method of claim 1, further comprising one of the first agent or the second agent receiving data from a third agent to transmit to the centralized service.

4. The method of claim 1, wherein step (a) further comprises transmitting, by the first agent to the centralized service, data about the environment comprising one of operation or performance of a combination of software and hardware of the first device.

5. The method of claim 1, wherein step (b) further comprises transmitting, by the second agent to the centralized service, data about the environment comprising one of operation or performance of a combination of software and hardware of the second device.

6. The method of claim 1, wherein step (c) further comprises receiving, by the first agent, the recommendation of the provisioning action comprising at least one of the following: installation of recommended software, installation of recommended hardware, configuration action on installed software, configuration action on installed hardware of the device, execution of an optimization tool, execution of software, purchase of one or more remote services of the centralized service, provisioning of one or more remote services of the centralized service, de-installation of software, de-installation of hardware, a change to configuration of operating system, and a change to state of the operating system.

7. The method of claim 1, wherein step (d) further comprises transmitting, by the first agent to the centralized service, a request from the user to perform the provisioning action.

8. The method of claim 1, wherein step (d) further comprises transmitting, by the first agent, one of a status or result of execution of the provisioning action.

9. A method for provisioning by an agent a remote service from a centralized service, the method comprising:
   (a) transmitting, by an agent executing on a device to a centralized service executing on a server, data about an environment of the device of a user, the data comprising data about one or more networks of the user's environment for communicating by the device;
   (b) receiving, by the agent from the centralized service, a recommendation of a remote service to be delivered by the centralized service to the device, the recommendation from the centralized service based on correlating data about the environment of the device of the user with data about environments of other devices of different users stored in a cross-device database; and
   (c) provisioning, by the agent in response to the recommendation, delivery of the remote service by the centralized service to the device.

10. The method of claim 9, wherein step (a) further comprises transmitting, by the agent, data about one of operation or performance of a combination of software and hardware of the device.

11. The method of claim 9, wherein step (b) further comprises receiving, by the agent, a compilation of services generated from a service compiler of the centralized service.

12. The method of claim 9, wherein step (b) further comprises receiving, by the agent, a recommended subscription to one or more remote services provided by the centralized service.

13. The method of claim 9, wherein step (c) further comprises automatically connecting, by the agent, to the centralized service to provision the remote service.

14. The method of claim 9, wherein step (c) further comprises provisioning, by the agent, the remote service responsive to a policy of the user.

15. A method for providing remote support service to a wireless device by a centralized service, the method comprising:
  (a) transmitting, to a centralized service executing on a server by a first agent executing on a first device of a plurality of devices of a user, data about an environment of the first device;
  (b) transmitting, to the centralized service by a second agent executing on a wireless device of a plurality of devices of the user, data about an environment of the wireless device, the centralized service correlating data about the environment of the first device and data about the environment of the wireless device of the user,
  (c) transmitting, by the second agent, a request to the centralized service for support on the wireless device responsive to selection by the user of a single user interface element on the wireless device; and
  (d) receiving, by the wireless device via the second agent responsive to the request, a connection from the centralized service to receive remote support by a remote support personnel over the connection to the wireless device.

16. The method of claim 15, wherein the first device is wireless.

17. The method of claim 15, wherein step (a) further comprises transmitting, by the first agent to the centralized service, data about the environment comprising one of operation or performance of the first device.

18. The method of claim 15, wherein step (a) further comprises transmitting, by the second agent to the centralized service, data about the environment comprising one of operation or performance of the wireless device.

19. The method of claim 15, wherein step (c) further comprises detecting, by the second agent, the user's selection of the single user interface element to request support from the centralized service.

20. The method of claim 15, wherein step (d) further comprises establishing, by the second agent, the connection with the centralized service.

21. The method of claim 15, wherein step (d) further comprises receiving, via the connection, support from the remote support personnel selected from a pool of remote support personnel provided by the centralized service.

22. A system for receiving services from a centralized service, the system comprising:
  an agent executing on a processor of a device and in communication via a network with a centralized service executing on one or more servers;
  wherein the agent is configured for collecting data about one of operation or performance of a combination of software and hardware installed on the device and communicating the collected data to the centralized service;
  wherein the agent is configured for remote delivery of a compilation of services from the centralized service determined based on data collected from the data collection component; and
  wherein the agent is configured for provisioning a resource on the device based on a recommendation from the centralized service; and
  wherein the agent is configured for identifying to the user of the device one of a product or service for the device based on a recommendation generated from the centralized service based on data collected from the data collection component.

23. The system of claim 22, wherein
  the agent is configured for discovering configuration of software and hardware of the device;
  the agent is configured for performing diagnostics on the combination of software and hardware of the device;
  the agent is configured for reporting on one of the operation or performance of the device; and
  the agent is configured for alerting the user about information from other components of the agent.

* * * * *